United States Patent
Wendland et al.

(10) Patent No.: US 11,400,433 B2
(45) Date of Patent: Aug. 2, 2022

(54) COMPOSITE GRANULES INCLUDING METAL-CONTAINING POLYMERIC MATERIALS

(71) Applicant: 3M INNOVATIVE PROPERTIES COMPANY, St. Paul, MN (US)

(72) Inventors: Michael S. Wendland, North St. Paul, MN (US); Michael W. Kobe, Lake Elmo, MN (US); Duane D. Fansler, Dresser, WI (US); Matthew A. Rankin, Brockville (CA)

(73) Assignee: 3M Innovative Properties Company, St. Paul, MN (US)

( * ) Notice: Subject to any disclaimer, the term of this patent is extended or adjusted under 35 U.S.C. 154(b) by 750 days.

(21) Appl. No.: 16/349,318

(22) PCT Filed: Nov. 13, 2017

(86) PCT No.: PCT/US2017/061229
§ 371 (c)(1),
(2) Date: May 13, 2019

(87) PCT Pub. No.: WO2018/089870
PCT Pub. Date: May 17, 2018

(65) Prior Publication Data
US 2020/0188875 A1  Jun. 18, 2020

Related U.S. Application Data

(60) Provisional application No. 62/421,584, filed on Nov. 14, 2016.

(51) Int. Cl.
| | |
|---|---|
| *B01J 20/26* | (2006.01) |
| *B01J 20/10* | (2006.01) |
| *B01J 20/22* | (2006.01) |
| *B01J 20/24* | (2006.01) |
| *B01J 20/28* | (2006.01) |
| *G01N 21/78* | (2006.01) |
| *G01N 21/81* | (2006.01) |

(52) U.S. Cl.
CPC ............ *B01J 20/261* (2013.01); *B01J 20/10* (2013.01); *B01J 20/223* (2013.01); *B01J 20/24* (2013.01); *B01J 20/2803* (2013.01); *G01N 21/783* (2013.01); *G01N 21/81* (2013.01)

(58) Field of Classification Search
CPC .......................... B01J 20/223; B01J 20/261
See application file for complete search history.

(56) References Cited

U.S. PATENT DOCUMENTS

| | | | |
|---|---|---|---|
| 4,245,053 A | 1/1981 | Nagai | |
| 5,174,938 A | 12/1992 | Ito | |
| 2005/0098495 A1 | 5/2005 | Hughes | |
| 2006/0143971 A1* | 7/2006 | Mitchell | A01K 85/01 43/42.06 |
| 2008/0081872 A1 | 4/2008 | Osman | |

FOREIGN PATENT DOCUMENTS

| | | |
|---|---|---|
| EP | 0971790 B1 | 6/2005 |
| JP | S63196651 A2 | 8/1988 |
| JP | H2277555 A2 | 11/1990 |
| JP | 2009113034 A2 | 5/2009 |
| WO | WO 2013-147934 | 10/2013 |
| WO | WO 2014078088 | 5/2014 |
| WO | WO 2015-095110 | 6/2015 |
| WO | WO 2015-095115 | 6/2015 |
| WO | WO 2016-186858 | 11/2016 |
| WO | WO 2017-106434 | 9/2017 |
| WO | WO 2017-160634 | 9/2017 |
| WO | WO 2017-160650 | 9/2017 |

OTHER PUBLICATIONS

International Search report for PCT International Application No. PCT/US2017/061229 dated Feb. 23, 2018, 5 pages.

* cited by examiner

*Primary Examiner* — Peter F Godenschwager
(74) *Attorney, Agent, or Firm* — Jean A. Lown

(57) ABSTRACT

Composite granules that include metal-containing polymeric materials, and composite granules that include metal complex-containing polymeric materials are provided. The polymeric materials are divinylbenzene/maleic anhydride polymers, partially hydrolyzed divinylbenzene/maleic anhydride polymers, or fully hydrolyzed divinylbenzene/maleic anhydride polymers. Additionally, methods of using the composite granules that include metal-containing polymeric materials to capture volatile, basic nitrogen-containing compounds and methods of using composite granules that include zinc-containing polymeric material to detect the presence of water vapor are provided.

19 Claims, No Drawings

COMPOSITE GRANULES INCLUDING METAL-CONTAINING POLYMERIC MATERIALS

CROSS REFERENCE TO RELATED APPLICATION

This application is a national stage filing under 35 U.S.C. 371 of PCT/US2017/061229, filed, Nov. 13, 2017, which claims the benefit of U.S. Provisional Patent Application No. 62/421584, filed Nov. 14, 2016, the disclosures of which are incorporated by reference herein in their entirety.

BACKGROUND

Ammonia is a commonly used chemical and is present in many different environments. For example, ammonia is present at various manufacturing sites for use in a wide range of chemical reactions, on farms where anhydrous ammonia is used as a fertilizer or where animal excrement is present but ventilation may be inadequate, or in offices and homes from the use of ammonia-containing cleansers.

Ammonia vapors can pose a significant health risk. For example, in the United States, OSHA has set an eight hour exposure limit of 25 parts per million for ammonia vapor and NIOSH recently lowered the IDLH (immediately dangerous to life and health) level from 500 parts per million to 300 parts per million. That is, exposure to ammonia vapor at concentrations greater than 300 parts per million for 30 minutes can result in death or irreversible damage to health.

Because of both the prevalence and potential health risks of ammonia, various respiratory products have been developed to reduce exposure to this compound and to other volatile nitrogen-containing compounds such as amines. These respiratory products typically contain a sorbent that can capture ammonia or volatile amines and thereby remove them from the air. Activated carbons are the most commonly used sorbent. Activated carbons are microporous and are good sorbents for a variety of compounds such as volatile organic compounds (VOCs) through the mechanism of physisorption. Physisorbed compounds are adsorbed but do not chemically react with the surface of the activated carbons.

Unlike many volatile organic compounds, ammonia and volatile amines typically are not effectively captured by physisorption. Rather, ammonia and volatile amines are usually more effectively captured through chemisorption where the compounds chemically react with the sorbent itself or with a compound impregnated into the sorbent. Many efforts have been made to impregnate activated carbons with various materials that can react with ammonia and volatile amines. For example, activated carbon has been impregnated with various mineral acids such as sulfuric acid and phosphoric acid. The highly corrosive nature of these impregnated mineral acids makes the manufacture of these sorbents difficult. These acidic impregnates are often replaced with metal salts such as metal chlorides or metal acetates. The capacities of the metal salt impregnated activated carbons can be comparable to mineral acid impregnated activated carbons.

Materials and methods for capturing volatile, basic, nitrogen-containing compounds are still needed.

SUMMARY

Composite granules including metal-containing polymeric materials and composite granules including metal complex-containing polymeric materials are provided. Additionally, methods of using the composite granules including metal-containing polymeric materials to capture volatile, basic, nitrogen-containing compounds, and methods of using composite granules including a zinc-containing polymeric material to detect the presence of water vapor are provided.

In a first aspect, composite granules including a binder and a metal-containing polymeric material is provided that includes: a) a polymeric material; and b) a divalent metal incorporated into the polymeric material, wherein the divalent metal is present in an amount equal to at least 10 weight percent (wt-%), based on a total weight of the polymeric material (or at least 1.5 mmol of divalent metal per gram of the polymeric material).

The polymeric materials of the metal-containing materials are divinylbenzene/maleic anhydride polymers, partially hydrolyzed divinylbenzene/maleic anhydride polymers, or fully hydrolyzed divinylbenzene/maleic anhydride polymers. In certain embodiments, the polymeric material of the metal-containing compounds contains i) 15 to 65 wt-% of a first monomeric unit that is of Formula (I),

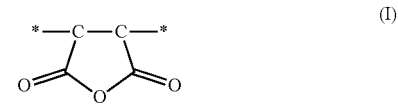 [SMILES: *C1C(=O)OC(=O)C1*]

Formula (II),

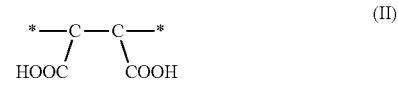 [SMILES: *C(C(=O)O)C(*)C(=O)O]

or a mixture thereof; ii) 30 to 85 wt-% of a second monomeric unit that is of Formula (III); and

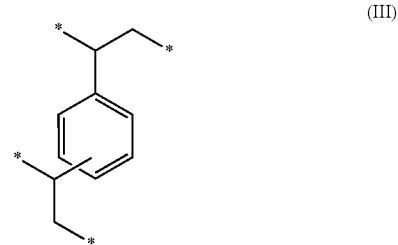

iii) 0 to 40 wt-% (or 5 to 40 wt-%) of a third monomeric unit that is of Formula (IV)

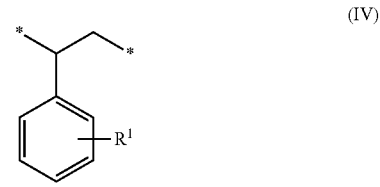

wherein each $R^1$ is independently hydrogen or an alkyl group. Each asterisk (*) in Formulas (I) to (IV) indicates the attachment sight to another monomeric unit or to a terminal group in the polymeric material.

In a second aspect, a method of capturing a basic, nitrogen-containing compound is provided. The method includes providing composite granules that include a metal-containing polymeric material as described above and then exposing the composite granules that include metal-containing polymeric material to the basic, nitrogen-containing compound. The basic, nitrogen-containing compound reacts with the divalent metal of the metal-containing polymeric material within the composite granules to form a metal complex.

In a third aspect, metal complex-containing composite granules prepared according to such method is provided. The resultant granules include a binder and a metal complex-containing polymeric material, wherein the metal complex includes a reaction product of a divalent metal and at least one basic, nitrogen-containing compound.

In a fourth aspect, a method for detecting the presence of water vapor is provided. The method includes providing composite granules including a metal-containing polymeric material as described above where the divalent metal is zinc (i.e., the metal-containing polymeric material is a zinc-containing polymeric material) and then exposing the composite granules including the zinc-containing polymeric material to water vapor. The color of the zinc-containing polymeric material within the composite granules changes after exposing the zinc-containing polymeric material to water vapor.

The term "granule" refers to a small particle. Typically, a granule has a particle size (i.e., the largest dimension of a particle, which is the diameter if the particle is spherical) of at least 30 microns. In certain embodiments, the particle size of a granule is at least 100 microns. In certain embodiments, the particle size of a granule is up to 26,000 microns, or up to 2500 microns.

The term "divalent metal" refers to a metal having an oxidation state of +2. The divalent metal typically is from Group 2 or Groups 6 to 12 of the IUPAC Periodic Table of Elements. To avoid confusion, Group 2 has beryllium as its lightest member, Group 6 has chromium as its lightest member, Group 7 has manganese as its lightest member, Group 8 has iron as its lightest member, Group 9 has cobalt as its lightest member, Group 10 has nickel as its lightest member, Group 11 has copper as its lightest member, and Group 12 has zinc as its lightest member. The divalent metal can be in the form of a metal salt, a metal complex, a metal oxide, or the like.

The terms "polymer" and "polymeric material" are used interchangeably and refer to materials formed by reacting one or more monomers. The terms include homopolymers, copolymers, terpolymers, or the like. Likewise, the terms "polymerize" and "polymerizing" refer to the process of making a polymeric material that can be a homopolymer, copolymer, terpolymer, or the like.

The term "monomer mixture" refers to that portion of a polymerizable composition that includes the monomers. More specifically, the monomer mixture includes at least divinylbenzene and maleic anhydride. The term "polymerizable composition" includes all materials included in the reaction mixture used to form the polymeric material. The polymerizable composition includes, for example, the monomer mixture, the organic solvent, the initiator, and other optional components. Some of the components in the polymerizable composition such as the organic solvent may not undergo a chemical reaction but can influence the chemical reaction and the resulting polymeric material that is formed.

The term "divinylbenzene/maleic anhydride polymeric material" refers to a polymeric material derived from divinylbenzene, maleic anhydride, and optionally a styrene-type monomer. Styrene-type monomers are often present as impurities in divinylbenzene. Typically, the divinylbenzene/maleic anhydride polymeric material contain 15 to 65 wt-% monomeric units derived from maleic anhydride and 35 to 85 wt-% monomeric units derived from divinylbenzene or a mixture of divinylbenzene and styrene-type monomers. The monomeric units derived from maleic anhydride can be monomeric units of Formula (I), Formula (II), or a mixture thereof. That is, these monomeric units can have an anhydride group as in Formula (I) or two carboxyl groups as in Formula (II) depending on the extent that the polymeric material has been hydrolyzed.

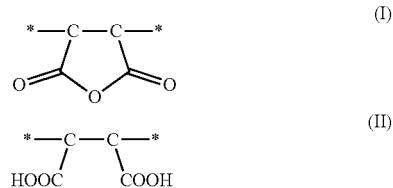

The monomeric units derived from divinylbenzene are of Formula (III) and those derived from styrene-type monomers are of Formula (IV).

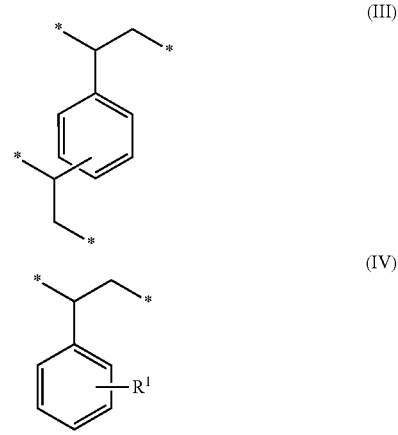

wherein each $R^1$ is independently hydrogen or an alkyl group. Each asterisk (*) in Formulas (I) to (IV) indicates the attachment sight to another monomeric unit or to a terminal group in the polymeric material.

The polymeric material of the metal-containing material can be considered to be non-hydrolyzed, partially hydrolyzed, or fully hydrolyzed depending on the form of the monomeric unit derived from maleic anhydride. The polymeric material can be referred to as being "non-hydrolyzed" if 90 to 100 wt-% of the monomeric units derived from maleic acid are of Formula (I) and 0 to less than 10 wt-% of the monomeric units derived from maleic anhydride are of Formula (II). The polymeric material can be referred to as being "partially hydrolyzed divinylbenzene/maleic anhydride polymeric material" if 10 to 90 wt-% of the monomeric units derived from maleic anhydride are of Formula (I) and 10 to 90 wt-% of the monomeric units derived from maleic anhydride are of Formula (II). The polymeric material of the metal-containing material can be referred to as being "fully hydrolyzed divinylbenzene/maleic anhydride polymeric material" if 0 to less than 10 wt-% of the monomeric units derived from maleic anhydride are of Formula (I) and greater than 90 to 100 percent of the monomeric units derived from maleic anhydride are of Formula (II). Frequently, however, a polymeric material of the metal-containing material that is non-hydrolyzed or partially hydrolyzed prior to incorporation of divalent metal undergoes some hydrolysis during incorporation of the divalent metal. That is, incorporation of the divalent metal, which is usually done in an aqueous solution, can result in some hydrolysis of the polymeric material having monomer units of Formula (I). Incorporation of the divalent metal can change a non-hydrolyzed divinylbenzene/maleic anhydride polymeric material to a partially hydrolyzed divinylbenzene/maleic anhydride polymeric material or can further hydrolyze a partially hydrolyzed divinylbenzene/maleic anhydride polymeric material.

The term "styrene-type monomer" refers to styrene, an alkyl substituted styrene (e.g., ethyl styrene), or mixtures thereof. These monomers are often present in divinylbenzene as impurities.

The term "surface area" refers to the total area of a surface of a material including the internal surfaces of accessible pores. The surface area is typically calculated from adsorption isotherms obtained by measuring the amount of an inert gas such as nitrogen or argon that adsorbs on the surface of a material under cryogenic conditions (i.e., 77° K) over a range of relative pressures. The term "BET specific surface area" is the surface area per gram of a material that is typically calculated from adsorption isotherm data of the inert gas over a relative pressure range of 0.05 to 0.3 using the BET method (Brunauer-Emmett-Teller Method).

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 30° C., or 20° C. to 25° C., or 22° C. to 25° C.

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

When a group is present more than once in a formula described herein, each group is "independently" selected, whether specifically stated or not. For example, when more than one Y group is present in a formula, each Y group is independently selected. Furthermore, subgroups contained within these groups are also independently selected. For example, when each Y group contains an R, then each R is also independently selected.

The words "preferred" and "preferably" refer to embodiments of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION OF ILLUSTRATIVE EMBODIMENTS

Composite granules of the present disclosure include a binder and a metal-containing polymeric material. The metal-containing polymeric material includes: a) a polymeric material; and b) a divalent metal incorporated into the polymeric material, wherein the divalent metal is present in an amount equal to at least 10 weight percent (wt-%), based on a total weight of the polymeric material (or at least 1.5 mmol of divalent metal per gram of the polymeric material). Such materials are useful as sorbents.

The production of metal-containing polymeric sorbents can involve the use of pressurized reactors that results in a single block of material. This block of material is then broken up and crushed into fine particles using a rotary mill. Typical mills include a screen to help control the particle size by keeping all crushed particles smaller than the size of the holes in the screen. During the crushing and milling of the material, a significant amount of fine particles are made, too small to be used in some filtration applications. For example, as much as one third of the polymeric material that is crushed and milled can be too small for use in certain filtration applications.

This fine material, which typically has no use, can be built up into larger particles of a useable size using a binder allowing for full use of the polymeric material, thereby reducing the overall cost of production of sorbent materials.

Furthermore, some of the processes for making articles containing sorbents can be rather rough on the sorbents, such as making sorbent loaded webs, loading respirator cartridges, and ultrasonic welding of respirators and respirator cartridges. Having tougher sorbents improves the ability for sorbents to survive these processes without producing unwanted fine material. It has been found that using a binder to produce granules from fine material of the metal-containing polymeric material can result in composite granules with improved toughness compared to granules of metal-containing polymeric material containing no binder. In addition, the composite granules of the present disclosure can be produced without negatively impacting the ability of the metal-containing polymeric material to adsorb water or basic, nitrogen-containing compounds, to the extent that the composite granules are not useful as sorbents.

The binder of the composite granules can be an organic material (e.g., carboxy methyl cellulose), an inorganic material (e.g., sodium metasilicate), or a combination thereof (e.g., magnesium stearate).

In certain embodiments, the binder is present in the composite granules in an amount of at least 1 wt-%, at least 2 wt-%, at least 5 wt-% based on the total weight of the composite granules. In certain embodiments, the binder is present in the composite granules in an amount of up to 30 wt-%, up to 25 wt-%, or up to 20 wt-%, based on the total weight of the composite granules.

In certain embodiments, the metal-containing polymeric material is present in the composite granules in an amount of at least 70 wt-%, at least 75 wt-%, or at least 80 wt-%, based on the total weight of the composite granules. In certain embodiments, the metal-containing polymeric material is present in the composite granules in an amount of up to 99 wt-%, based on the total weight of the composite granules.

Such composite granules can be used in a method of capturing a basic, nitrogen-containing compound. The basic, nitrogen-containing compound reacts with the divalent metal of the metal-containing polymeric material within the composite granules to form a metal complex. The resultant granules include a binder and a metal complex-containing polymeric material, wherein the metal complex includes a reaction product of a divalent metal and at least one basic, nitrogen-containing compound.

When the divalent metal is zinc, the composite granules can be used in a method of detecting the presence of water vapor. The color of the zinc-containing polymeric material within the composite granules changes after exposing the zinc-containing polymeric material to water vapor.

Metal-Containing Polymeric Materials

The polymeric materials of the metal-containing polymeric materials include non-hydrolyzed divinylbenzene/maleic anhydride polymers, partially hydrolyzed divinylbenzene/maleic anhydride polymers, or fully hydrolyzed divinylbenzene/maleic anhydride polymers. The divalent metal is selected from Group 2 or Group 6 to Group 12 of the IUPAC Periodic Table. The metal-containing polymeric materials can be used to capture basic, nitrogen-containing compounds having a molecular weight no greater than 150 grams/mole. This capture results in the formation of the metal complex-containing polymeric materials. The metal-containing polymeric materials within the composite granules often change color upon exposure to basic, nitrogen-containing compounds.

Further, zinc-containing polymeric material can be used to capture water vapor or to indicate the presence of water vapor. The color of the zinc-containing polymeric material typically changes upon exposure to water vapor.

The polymeric material is prepared from divinylbenzene, maleic anhydride, and an optional styrene-type monomer. The resulting non-hydrolyzed divinylbenzene/maleic anhydride polymeric material can then be treated with divalent metal. Alternatively, all or any portion of the anhydride groups in the non-hydrolyzed divinylbenzene/maleic anhydride polymeric material can be treated with a hydrolyzing agent to prepare a partially hydrolyzed divinylbenzene/maleic anhydride polymeric material or fully hydrolyzed divinylbenzene/maleic anhydride polymeric material that is then treated with the divalent metal.

The polymeric material that is subsequently incorporated with divalent metal is typically porous. More specifically, the amount of divinylbenzene crosslinker, the amount of maleic anhydride, the amount of optional styrene-type monomer, and the organic solvent used to prepare the non-hydrolyzed polymeric material are carefully selected to prepare polymeric materials that are porous. Porous materials can be characterized based on the size of their pores. The term "micropores" refers to pores having a diameter of less than 2 nanometers. The term "mesopores" refers to pores having a diameter in a range of 2 to 50 nanometers. The term "macropores" refers to pores having a diameter greater than 50 nanometers. In particular, the polymeric materials, at least prior to incorporation of the divalent metal, usually have pores in the size range of micropores and/or mesopores.

The porosity of the polymeric material can be characterized from an adsorption isotherm of an inert gas such as nitrogen or argon by the porous material under cryogenic conditions. The adsorption isotherm is typically obtained by measuring adsorption of the inert gas by the porous material at multiple relative pressures in a range of about $10^{-6}$ to about 0.98. The isotherms are then analyzed using various methods to calculate specific surface areas (such as BET specific surface area) and total pore volume. The conditions used to synthesize the non-hydrolyzed divinylbenzene/maleic anhydride polymeric material are selected to produce metal-containing polymeric materials having a BET surface area equal to at least 15 square meters per gram ($m^2$/g), at least 20 $m^2$/g, at least 25 $m^2$/g, or at least 50 $m^2$/g.

The non-hydrolyzed divinylbenzene/maleic anhydride polymeric material is synthesized from a monomer mixture of maleic anhydride, divinylbenzene, and an optional styrene-type monomer. Typically, the divinylbenzene/maleic anhydride polymeric material contains 15 to 65 wt-% monomeric units derived from maleic anhydride and 35 to 85 wt-% monomeric units derived from divinylbenzene or a mixture of divinylbenzene and styrene-type monomers. More particularly, the monomer mixture used to form the non-hydrolyzed divinylbenzene/maleic anhydride typically includes 1) 15 to 65 wt-% maleic anhydride, 2) 30 to 85 wt-% divinylbenzene, and 3) 0 to 40 wt-% (or 5 to 40 wt-%) of a styrene-type monomer, wherein the styrene-type monomer is styrene, an alkyl substituted styrene, or a combination thereof. The amount of each monomer is based on the total weight of monomers in the monomer mixture.

The amount of maleic anhydride used in the monomer mixture to prepare the non-hydrolyzed polymeric material effects the amount of divalent metal that can be incorporated into the polymeric material. If the amount of maleic anhydride is too low (e.g., below 15 wt-% of the monomers in the monomer mixture), the amount of divalent metal in the metal-containing polymeric material may be too low to effectively and efficiently capture basic, nitrogen-containing compounds. On the other hand, if the amount of maleic anhydride is greater than 65 wt-% or 60 wt-% based on the total weight of monomers in the monomer mixture, the polymeric material may not have a sufficiently high BET specific surface area. If the BET specific surface area is too low, the polymeric material may not have sufficient porosity to incorporate a suitable amount of divalent metal.

In some embodiments, the amount of maleic anhydride in the monomer mixture is at least 15 wt-%, at least 20 wt-%, at least 25 wt-%, at least 30 wt-%, at least 35 wt-%, or at least 40 wt-%. The amount of maleic anhydride can be up to 65 wt-%, up to 62 wt-%, up to 61 wt-%, up to 60 wt-%, up to 55 wt-%, up 50 wt-%, up to 45 wt-%, or up to 40 wt-%. For example, the amount can be in a range of 15 to 65 wt-%, 15 to 60 wt-%, 20 to 60 wt-%, 25 to 60 wt-%, 30 to 60 wt-%, 35 to 60 wt-%, 40 to 60 wt-%, 15 to 55 wt-%, 15 to 50 wt-%, 15 to 45 wt-%, 20 to 50 wt-%, 20 to 45 wt-%, 25 to 50 wt-%, or 25 to 45 wt-%. The amounts are based on the total weight of monomers in the monomer mixture.

Stated differently, the polymeric material contains 15 to 65 wt-% monomeric units derived from maleic anhydride. The monomeric units derived from maleic anhydride are of Formula (I), Formula (II), or both. The relative amounts of Formula (I) and Formula (II) can vary depending on the degree of hydrolysis that has occurred. The amount of the monomeric units derived from maleic anhydride can be, for example, in a range of 15 to 60 wt-%, 20 to 60 wt-%, 25 to 60 wt-%, 30 to 60 wt-%, 35 to 60 wt-%, 40 to 60 wt-%, 15 to 55 wt-%, 15 to 50 wt-%, 15 to 45 wt-%, 20 to 50 wt-%, 20 to 45 wt-%, 25 to 50 wt-%, or 25 to 45 wt-% based on a total weight of the polymeric material.

The amount of divinylbenzene crosslinker can strongly influence the BET specific surface area of the divinylbenzene/maleic anhydride polymeric material whether it is non-hydrolyzed, partially hydrolyzed, or fully hydrolyzed. The divinylbenzene contributes to the high crosslink density and to the formation of a rigid polymeric material having micropores and/or mesopores. The BET specific surface area tends to increase with an increase in the amount of divinylbenzene in the monomer mixture. If the amount of divinylbenzene in the monomer mixture is less than 30 wt-%, the polymeric material may not have a sufficiently high BET specific surface area, particularly if the polymeric material is fully hydrolyzed. On the other hand, if the amount of divinylbenzene is greater than 85 wt-%, the anhydride and/or carboxylic acid content may be insufficient to incorporate the desired amount of the divalent metal.

In some embodiments, the amount of divinylbenzene is at least 30 wt-%, at least 35 wt-%, at least 40 wt-%, at least 45 wt-%, at least 50 wt-%, at least 55 wt-%, or at least 60 wt-%. The amount of divinylbenzene can be up to 85 wt-%, up to 80 wt-%, up to 75 wt-%, up to 70 wt-%, or up to 65 wt-%. For example, the divinylbenzene can be in a range of 30 to 85 wt-%, 30 to 80 wt-%, 30 to 75 wt-%, 30 to 70 wt-%, 30 to 60 wt-%, 30 to 55 wt-%, 30 to 50 wt-%, 40 to 80 wt-%, 50 to 80 wt-%, 40 to 75 wt-%, 50 to 75 wt-%, or 55 to 75 wt-%. The amounts are based on the total weight of monomers in the monomer mixture.

Stated differently, the polymeric material contains 30 to 85 wt-% of monomeric units derived from divinylbenzene. The amount of the monomeric unit derived from divinylbenzene can be, for example, in a range of 30 to 80 wt-%, 30 to 75 wt-%, 30 to 70 wt-%, 30 to 60 wt-%, 30 to 55 wt-%, 30 to 50 wt-%, 40 to 80 wt-%, 50 to 80 wt-%, 40 to 75 wt-%, 50 to 75 wt-%, or 55 to 75 wt-%. The amounts are based on the total weight of the polymeric material.

Divinylbenzene can be difficult to obtain in a pure form. For example, divinylbenzene is often commercially available with purity as low as 55 wt-%. Obtaining divinylbenzene with purity greater than about 80 wt-% can be expensive. The impurities accompanying divinylbenzene are typically styrene-type monomers such as styrene, alkyl substituted styrene (e.g., ethyl styrene), or mixtures thereof. Thus, styrene-type monomers are often present in the monomer mixture along with divinylbenzene and maleic anhydride. The monomer mixture typically contains 0 to 40 wt-% (or 5 to 40 wt-%) styrene-type monomers based on a total weight of monomers in the monomer mixture. If the content of the styrene-type monomer is greater than 40 wt-%, the crosslink density may be too low and/or the distance between crosslinks may be too large to provide a polymeric material with the desired BET specific surface area. This is particularly the situation if the polymeric material is fully hydrolyzed. As the crosslink density decreases, the resulting polymeric material tends to be less rigid and less porous.

In some embodiments, the amount of styrene-type monomers is at least 1 wt-%, at least 2 wt-%, at least 5 wt-%, or at least 10 wt-%. The amount of styrene-type monomer can be up to 40 wt-%, up to 35 wt-%, up to 30 wt-%, or up to 25 wt-%. For example, the amount of styrene-type monomer in the monomer mixture can be in a range of 0 to 40 wt-%, 1 to 40 wt-%, 5 to 40 wt-%, 1 to 30 wt-%, 5 to 30 wt-%, 1 to 20 wt-%, 5 to 20 wt-%, 5 to 15 wt-%, 10 to 40 wt-%, or 10 to 30 wt-%. The amounts are based on the total weight of monomers in the monomer mixture.

Stated differently, the polymeric material can contain 0 to 40 wt-% of monomeric units derived from styrene-type monomers. For example, the amount can be in a range of 1 to 40 wt-%, 5 to 40 wt-%, 1 to 30 wt-%, 5 to 30 wt-%, 1 to 20 wt-%, 5 to 20 wt-%, 5 to 15 wt-%, 10 to 40 wt-%, or 10 to 30 wt-%. The amounts are based on the total weight of the polymeric material.

Overall, the monomer mixture includes 15 to 65 wt-% maleic anhydride based on a total weight of monomers in the monomer mixture, 30 to 85 wt-% divinylbenzene based on the total weight of monomers in the monomer mixture, and 0 to 40 wt-% (or 5 to 40 wt-%) styrene-type monomer based on the total weight of monomers in the monomer mixture. In other embodiments, the monomer mixture contains 25 to 60 wt-% maleic anhydride, 30 to 75 wt-% divinylbenzene, and 1 to 30 wt-% styrene-type monomer. In other embodiments, the monomer mixture contains 30 to 60 wt-% maleic anhydride, 30 to 60 wt-% divinylbenzene, and 5 to 20 wt-% styrene-type monomer. In still other embodiments, the monomer mixture contains 40 to 60 wt-% maleic anhydride, 30 to 50 wt-% divinylbenzene, and 5 to 15 wt-% styrene-type monomer.

The monomer mixture typically contains at least 95 wt-% monomers selected from maleic anhydride, divinylbenzene, and styrene-type monomer. For example, at least 97 wt-%, at least 98 wt-%, at least 99 wt-%, at least 99.5 wt-%, or at least 99.9 wt-% of the monomers in the monomer mixture are selected from maleic anhydride, divinylbenzene, and styrene-type monomer. In many embodiments, the only monomers purposefully added to the monomer mixture are maleic anhydride and divinylbenzene with any other monomers being present (including the styrene-type monomers) as impurities in the maleic anhydride and the divinylbenzene.

That is, the polymeric material typically contains 15 to 65 wt-% monomeric units derived from maleic anhydride, 30 to 85 wt-% monomeric units derived from divinylbenzene, and 0 to 40 wt-% (or 5 to 40 wt-%) monomeric units derived from styrene-type monomers. In other embodiments, the polymeric material contains 25 to 60 wt-% monomeric units derived from maleic anhydride, 30 to 75 wt-% monomeric units derived from divinylbenzene, and 1 to 30 wt-% (or 10 to 30 wt-%) monomeric units derived from styrene-type monomers. In other embodiments, the polymeric material contains 30 to 60 wt-% monomeric units derived from maleic anhydride, 30 to 65 wt-% monomeric units derived from divinylbenzene, and 5 to 20 wt-% (or 10 to 20 wt-%) monomeric units derived from styrene-type monomer. In still other embodiments, the polymeric material contains 40 to 60 wt-% monomeric units derived from maleic anhydride, 30 to 55 wt-% monomeric units derived from divinylbenzene, and 5 to 20 wt-% (or 10 to 20 wt-%) monomeric units derived from styrene-type monomers.

In addition to the monomer mixture, the polymerizable composition used to form the non-hydrolyzed divinylbenzene/maleic anhydride polymeric material includes an organic solvent. The polymerizable composition is a single phase prior to polymerization. Stated differently, prior to polymerization, the polymerizable composition is not a suspension. The organic solvent is selected to dissolve the monomers included in the monomer mixture and to solubilize the polymeric material as it begins to form.

The organic solvent can function as a porogen as the divinylbenzene/maleic anhydride polymeric material is formed. The organic solvent choice can strongly influence the BET specific surface area and the size of the pores formed in the non-hydrolyzed polymeric material. Using organic solvents that are miscible with both the monomers and the forming polymer tend to result in the formation of polymeric material having micropores and mesopores. Good solvents for the monomers and the forming polymer tend to result in a larger fraction of the porosity of the final polymeric material being in the form of micropores and mesopores.

Organic solvents that can dissolve both the monomers and the forming polymeric material include, but are not limited to, ketones, esters, acetonitrile, and mixtures thereof. Other organic solvents can be added along with one or more of these organic solvents provided that the resulting non-hydrolyzed polymeric material has a BET specific surface area equal to at least 100 $m^2/g$. Examples of suitable ketones include, but are not limited to, alkyl ketones such as methyl ethyl ketone and methyl isobutyl ketone. Examples of suitable esters include, but are not limited to, acetate esters such as ethyl acetate, propyl acetate, butyl acetate, amyl acetate, and tert-butyl acetate.

The organic solvent can be used in any desired amount. The polymerizable compositions often have percent solids in a range of 1 to 70 wt-%. If the percent solids are too low, the polymerization time may become undesirably long. The percent solids are often at least 1 wt-%, at least 2 wt-%, at least 5 wt-%, at least 10 wt-%, or at least 15 wt-%. If the percent solids are too great, however, the monomers do not form a single phase with the organic solvent. Further, increasing the percent solids tends to result in the formation of larger diameter pores and as a result the polymeric material tends to have a lower BET specific surface area. The percent solids can be up to 70 wt-%, up to 65 wt-%, up to 60 wt-%, up to 50 wt-%, up to 40 wt-%, up to 30 wt-%, or up to 25 wt-%. For example, the percent solids can be in a range of 5 to 70 wt-%, 5 to 60 wt-%, 10 to 60 wt-%, 20 to 60 wt-%, or 25 to 50 wt-%.

In addition to the monomer mixture and organic solvent, the polymerizable compositions typically include an initiator for free radical polymerization reactions. Any suitable free radical initiator can be used. Suitable free radical initiators are typically selected to be miscible with the monomers included in the polymerizable composition. In some embodiments, the free radical initiator is a thermal initiator that can be activated at a temperature above room temperature. In other embodiments, the free radical initiator is a redox initiator. Because the polymerization reaction is a free radical reaction, it is desirable to minimize the amount of oxygen in the polymerizable composition.

Both the type and amount of initiator can affect the polymerization rate. In general, increasing the amount of the initiator tends to lower the BET specific surface area; however, if the amount of initiator is too low, it may be difficult to obtain high conversions of the monomers to polymeric material. The free radical initiator is typically present in an amount in a range of 0.05 to 10 wt-%, 0.05 to 8 wt-%, 0.05 to 5 wt-%, 0.1 to 10 wt-%, 0.1 to 8 wt-%, 0.1 to 5 wt-%, 0.5 to 10 wt-%, 0.5 to 8 wt-%, 0.5 to 5 wt-%, 1 to 10 wt-%, 1 to 8 wt-%, or 1 to 5 wt-%. The wt-% is based on a total weight of monomers in the polymerizable composition.

Suitable thermal initiators include organic peroxides and azo compounds. Example azo compounds include, but are not limited to, those commercially available under the trade designation VAZO from E.I. du Pont de Nemours Co. (Wilmington, Del.) such as VAZO 64 (2,2'-azobis(isobutyronitrile)), which is often referred to as AIBN, and VAZO 52 (2,2'-azobis(2,4-dimethylpentanenitrile)). Other azo compounds are commercially available from Wako Chemicals USA, Inc. (Richmond, Va.) such as V-601 (dimethyl 2,2'-azobis(2-methylproprionate)), V-65 (2,2'-azobis(2,4-dimethyl valeronitrile)), and V-59 (2,2'-azobis(2-methylbutyronitrile)). Organic peroxides include, but are not limited to, bis(1-oxoaryl)peroxides such as benzoyl peroxide (BPO), bis(1-oxoalkyl)peroxides such as lauroyl peroxide, and dialkyl peroxides such as dicumyl peroxide or di-tert-butyl peroxide and mixtures thereof. The temperature needed to activate the thermal initiator is often in a range of 25° C. to 160° C., in a range of 30° C. to 150° C., in a range of 40° C. to 150° C., in a range of 50° C. to 150° C., in a range of 50° C. to 120° C., or in a range of 50° C. to 110° C.

Suitable redox initiators include arylsulfinate salts, triarylsulfonium salts, or N,N-dialkylaniline (e.g., N,N-dimethylaniline) in combination with a metal in an oxidized state, a peroxide, or a persulfate. Specific arylsulfinate salts include tetraalkylammonium arylsulfinates such as tetrabutylammonium 4-ethoxycarbonylbenzenesulfinate, tetrabutylammonium 4-trifluoromethylbenzenesulfinate, and tetrabutylammonium 3-trifluoromethylbenzenesulfinate. Specific triarylsulfonium salts include those with a triphenylsulfonium cation and with an anion selected from $PF_6^-$, $AsF_6^-$, and $SbF_6^-$. Suitable metal ions include, for example, ions of Group 3 metals, transition metals, and lanthanide metals. Specific metal ions include, but are not limited to, Fe(III), Co(III), Ag(I), Ag(II), Cu(II), Ce(III), Al (III), Mo(VI), and Zn(II). Suitable peroxides include benzoyl peroxide, lauroyl peroxide, and the like. Suitable persulfates include, for example, ammonium persulfate, tetraalkylammonium persulfate (e.g., tetrabutylammonium persulfate), and the like.

The polymerizable composition is typically free or substantially free of surfactants. As used herein, the term "substantially free" in reference to the surfactant means that no surfactant is purposefully added to the polymerizable composition and any surfactant that may be present is the result of being an impurity in one of the components of the polymerizable composition (e.g., an impurity in the organic solvent or in one of the monomers). The polymerizable composition typically contains less than 0.5 wt-%, less than 0.3 wt-%, less than 0.2 wt-%, less than 0.1 wt-%, less than 0.05 wt-%, or less than 0.01 wt-% surfactant based on the total weight of the polymerizable composition. The absence of a surfactant is advantageous because these materials tend to restrict access to and, in some cases, fill micropores and mesopores in a porous material. The presence of a surfactant could reduce the capacity of the metal-containing polymeric material to adsorb low molecular weight basic molecules.

When the polymerizable composition is heated in the presence of a free radical initiator, polymerization of the monomers in the monomer mixture occurs. By balancing the amounts of each monomer in the monomer mixture and by selection of an organic solvent that can solubilize all of the monomers and the growing polymeric material during its early formation stage, a non-hydrolyzed polymeric material can be prepared that has a BET specific surface area equal to at least 100 m$^2$/g. The BET specific surface area of the non-hydrolyzed polymer can be at least 150 m$^2$/g, at least 200 m$^2$/g, at least 250 m$^2$/g, or at least 300 m$^2$/g. The BET specific surface area can be, for example, up to 1000 m$^2$/g or higher, up to 900 m$^2$/g, up to 800 m$^2$/g, up to 750 m$^2$/g, or up to 700 m$^2$/g.

The high BET specific surface area is at least partially attributable to the presence of micropores and/or mesopores in the non-hydrolyzed divinylbenzene/maleic anhydride polymeric material. The argon adsorption isotherms of the non-hydrolyzed divinylbenzene/maleic anhydride polymeric materials indicate that there is considerable adsorption at relative pressures below 0.1, which suggests that micropores are present. There is an increase in adsorption at higher relative pressures up to about 0.95. This increase is indicative of a wide distribution of mesopores. In some embodiments, at least 20 percent of the BET specific surface area is attributable to the presence of micropores and/or mesopores. The percentage of the BET specific surface area attributable to the presence of micropores and/or mesopores can be at least 25 percent, at least 30 percent, at least 40 percent, at least 50 percent, or at least 60 percent. In some embodiments, the percentage of the BET specific surface area attributable to the presence of micropores and/or mesopores can be up to 90 percent or higher, up to 80 percent or higher, or up to 75 percent or higher.

The non-hydrolyzed divinylbenzene/maleic anhydride polymeric material is granular and can be used directly as the polymeric material used to incorporate a divalent metal forming the metal-containing polymeric material. Alternatively, the non-hydrolyzed polymeric material can be treated with a hydrolyzing agent to provide a partially or fully hydrolyzed divinylbenzene/maleic anhydride polymeric material. The hydrolyzing agent reacts with the maleic anhydride units resulting in the formation of two carboxylic acid groups (—COOH groups). Any suitable hydrolyzing agent can be used that can react with the anhydride group (—(CO)—O—(CO)—) of the maleic anhydride units. In many embodiments, the hydrolyzing agent is a base such as a basic material dissolved in water. One example basic material is an alkali metal hydroxide such as sodium hydroxide (e.g., an aqueous solution of sodium hydroxide). Alternatively, the hydrolyzing agent could be water alone at elevated temperatures (e.g., above room temperature to boiling) or a dilute acid at slightly elevated temperatures (e.g., above room temperature to about 80° C.). In many embodiments, the preferred hydrolyzing agent is a base such as an alkali metal hydroxide. The non-hydrolyzed divinylbenzene/maleic anhydride polymeric material is mixed with a solution of alkali metal hydroxide dissolved in water or an alcohol such as methanol. The mixture is heated at a temperature near 80° C. for several hours (e.g., 4 to 12 hours). The hydrolyzed polymeric material can then be treated with hydrochloric acid to convert any carboxylate salts to carboxylic acid groups.

Stated in terms of the monomeric units present in the non-hydrolyzed, partially hydrolyzed, or fully hydrolyzed anhydride polymeric material, the polymeric material contains i) 15 to 65 wt-% of a first monomeric unit that is of Formula (I),

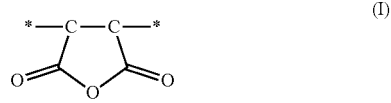

(I)

Formula (II),

(II)

or a mixture thereof; ii) 30 to 85 wt-% of a second monomeric unit that is of Formula (III); and

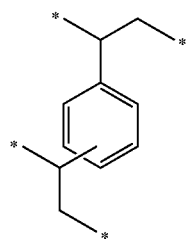

(III)

iii) 0 to 40 wt-% (or 5 to 40 wt-%) of a third monomeric unit that is of Formula (IV)

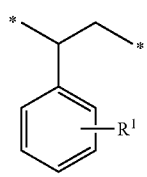

(IV)

wherein each $R^1$ is independently hydrogen or an alkyl group. Each asterisk (*) in Formulas (I) to (IV) indicates the attachment sight to another monomeric unit or to a terminal group in the polymeric material.

Formula (I) corresponds to a non-hydrolyzed monomeric unit derived from maleic anhydride. This non-hydrolyzed monomeric unit contains an anhydride group (—(CO)—O—(CO)—). Formula (II) corresponds to a hydrolyzed monomeric unit derived from maleic anhydride. The hydrolyzed monomeric unit has two carboxylic acid groups (—(CO)OH) rather than an anhydride group. Formula (III) corresponds to a monomeric unit derived from divinylbenzene. The two alkylene groups attached to the aromatic ring can be in a meta- or para-position to each other. Formula (IV) is for a styrene-type monomeric unit. Each $R^1$ group is independently hydrogen or an alkyl group (e.g., an alkyl with 1 to 4 carbon atoms or 2 carbon atoms). In many embodiments, each $R^1$ group is ethyl and the monomeric unit of Formula (IV) is derived from ethyl styrene, an impurity often present in divinylbenzene. The $R^1$ group is often in a meta- or para-position relative to the alkylene group attached to the aromatic ring. Each asterisk (*) in Formulas (I) to (IV) indicates the attachment sight to another monomeric unit or to a terminal group in the polymeric material. The amounts of each of the first, second, and third monomeric units are the same as described above for the amounts of each monomer used to form the non-hydrolyzed divinylbenzene/maleic anhydride polymeric material.

If either partially or fully hydrolyzed, the polymeric material contains carboxylic acid groups. If the pH is sufficiently high, the polymeric material can be negatively charged. Typically, the polymeric material itself does not have any positively charged groups.

The hydrolyzed (e.g., fully hydrolyzed) divinylbenzene/maleic anhydride polymeric material has a BET specific surface area less than that of the non-hydrolyzed divinylbenzene/maleic anhydride polymeric material. The opening of the anhydride group may sufficiently increase the conformational freedom in the backbone resulting in decreased porosity. In addition, hydrogen bonding between carboxylic acids in the hydrolyzed material may possibly restrict or block access to pores. The BET specific surface area of the hydrolyzed polymeric material is often about 30 to 80 percent, 30 to 60 percent, 40 to 80 percent, or 40 to 60 percent of the BET specific surface area of the non-hydrolyzed polymeric material. Because of this decrease, it is often desirable to prepare a non-hydrolyzed divinylbenzene/maleic anhydride polymeric material having the highest possible BET specific surface area yet having sufficient maleic anhydride units to allow adequate incorporation of the divalent metal.

The hydrolyzed (e.g., fully hydrolyzed) divinylbenzene/maleic anhydride polymeric material typically has a BET specific surface area equal to at least 50 $m^2/g$ or at least 100 $m^2/g$. In some embodiments, the BET specific surface area is at least 150 $m^2/g$, at least 175 $m^2/g$, at least 200 $m^2/g$, at least 225 $m^2/g$, at least 250 $m^2/g$, or at least 300 $m^2/g$. The BET specific surface area can be up to 600 $m^2/g$ or higher, up to 500 $m^2/g$, or up to 400 $m^2/g$. In some embodiments, the BET specific surface area is in a range of 50 to 600 $m^2/g$, in a range of 75 to 600 $m^2/g$, in a range of 100 to 600 $m^2/g$, or in a range of 200 to 600 $m^2/g$.

The argon adsorption isotherms of the hydrolyzed (e.g., fully hydrolyzed) divinylbenzene/maleic anhydride polymeric materials indicate that there is some adsorption at relative pressures below 0.1, which suggests that micropores are present. There is an increase in adsorption at higher relative pressures up to about 0.95. This increase is indicative of a wide distribution of mesopores. In some embodiments, at least 20 percent of the BET specific surface area is attributable to the presence of micropores and/or mesopores. The percentage of the BET specific surface area attributable to the presence of micropores and/or mesopores can be at least 25 percent, at least 30 percent, at least 40 percent, at least 50 percent, or at least 60 percent. In some embodiments, the percentage of the BET specific surface area attributable to the presence of micropores and/or mesopores can be up to 90 percent or higher, up to 80 percent, or higher, or up to 75 percent or higher. In many embodiments, the BET specific surface area is attributable mainly to the presence of mesopores.

After formation of the polymeric material (i.e., non-hydrolyzed, partially hydrolyzed, or fully hydrolyzed divinylbenzene/maleic anhydride polymeric material), a divalent metal is incorporated into the polymeric material. The divalent metal is typically incorporated by treating the polymeric material with a solution of a metal salt dissolved in water. The metal salt contains a cation that is the divalent metal (i.e., a metal with a +2 oxidation state) and an anion. Suitable metal ions (divalent metals) are typically from Group 2 or Groups 6 to 12 of the periodic table. Example divalent metals include, but are not limited to, chromium, nickel, cobalt, copper, zinc, manganese, cadmium, iron, magnesium, calcium, barium, or a mixture thereof. In many embodiments, the divalent metal is a Group 6 to 12 metal such as, for example, chromium, nickel, cobalt, copper, zinc, iron, or a mixture thereof. In some particular embodiments, the divalent metal is copper, cobalt, zinc, or nickel. In some even more particular embodiments, the divalent metal is zinc or copper.

The metal salts are typically selected from those that are soluble in water. The anion of the metal salt is often a halide (e.g., chloride), nitrate, sulfate, carboxylate (e.g., acetate, formate, and propanoate), or halogen-substituted carboxylates (e.g., chloroacetate, dichloroacetate, and chloro-substituted propanoate). In many embodiments, the anion is chloride, acetate, or nitrate.

Examples of specific metal salts include, but are not limited to, zinc acetate, copper acetate, nickel acetate, cobalt acetate, iron acetate, manganese acetate, chromium acetate, cadmium acetate, zinc formate, copper formate, nickel formate, cobalt formate, iron formate, manganese formate, cadmium formate, zinc propanoate, copper propanoate, nickel propanoate, cobalt propanoate, iron propanoate, manganese propanoate, cadmium propanoate, zinc chloroacetate, copper chloroacetate, nickel chloroacetate, cobalt chloroacetate, iron chloroacetate, manganese chloroacetate, cadmium chloroacetate, zinc dichloroacetate, copper dichloroacetate, nickel dichloroacetate, cobalt dichloroacetate, iron dichloroacetate, manganese dichloroacetate, cadmium dichloroacetate, zinc chloride, copper chloride, nickel chloride, cobalt chloride, iron chloride, manganese chloride, cadmium chloride, chromium chloride, magnesium chloride, zinc sulfate, copper sulfate, nickel sulfate, cobalt sulfate, iron sulfate, manganese sulfate, cadmium sulfate, zinc nitrate, copper nitrate, nickel nitrate, cobalt nitrate, iron nitrate, and the like.

The divalent metal is typically incorporated by treating the polymeric material with a solution of the metal salt dissolved in water. The concentrations of the metal salt solutions are often in a range of 0.1 to 10 moles/liter. In some embodiments, the concentration is in a range of 0.5 to 10 moles/liter, in a range of 1 to 10 moles/liter, in a range of 1 to 8 moles/liter, in a range of 2 to 8 moles/liter, or in a range of 3 to 6 moles/liter. The resulting solution is mixed with the polymeric material. The amount of metal salt is typically added such that the moles of divalent metal are in excess compared to the moles of anhydride, carboxyl groups (—COOH groups), or both in the polymeric material.

The mixing time of the metal salt solution with the polymeric material is often up to 1 hour, up to 2 hours, up to 4 hours, up to 8 hours, up to 16 hours, up to 24 hours, or up to 48 hours. The mixing temperature can be at room temperature or above. The metal-containing polymeric material is then separated from the water and dried. Any suitable method of drying can be used. In some embodiments, the metal-containing polymeric material is dried under vacuum in an oven set at 80° C. to 120° C. The process of incorporation of the divalent metal into non-hydrolyzed polymeric material or partially hydrolyzed polymeric materials may result in some hydrolysis or further hydrolysis of at least a portion of the anhydride groups.

In some embodiments, the resulting metal-containing polymeric material contains at least 10 wt-% of the divalent metal based on a total weight of the polymeric material. The amount of the divalent metal can be at least 15 wt-%, at least 20 wt-%, at least 25 wt-%, at least 30 wt-%, at least 40 wt-%, or at least 50 wt-% based on a total weight of the polymeric material. The metal-containing polymeric material can include up to 100 wt-% or more of the divalent metal (i.e., the weight of the divalent metal can be equal to or exceed the weight of the polymeric material). For example, the amount can be up to 90 wt-%, up to 80 wt-%, up to 75 wt-%, up to 70 wt-%, up to 60 wt-%, or up to 50 wt-% based on the total weight of the polymeric material. For example, the amount is often in a range of 10 to 100 wt-%, 10 to 80 wt-%, 10 to 60 wt-%, 10 to 50 wt-%, 10 to 40 wt-%, 10 to 30 wt-%, 15 to 60 wt-%, 15 to 50 wt-%, 15 to 40 wt-%, 15 to 30 wt-%, 20 to 60 wt-%, 20 to 50 wt-%, 20 to 40 wt-% or 20 to 30 wt-%.

In other embodiments or stated differently, the resulting metal-containing polymeric material contains at least 1.5 millimoles (mmol) of the divalent metal per gram of the polymeric material. The amount of the divalent metal can be at least 2.0 mmol, at least 2.25 mmol, at least 3.0 mmol, at least 3.75 mmol, at least 4.0 mmol, at least 4.5 mmol, at least 5 mmol, at least 6.0 mmol, at least 7 mmol, or at least 7.5 mmol per gram of the polymeric material. The metal-containing polymeric material can include up to 15 mmol or more of the divalent metal per gram. For example, the amount can be up to 14 mmol, up to 13.5 mmol, up to 13 mmol, up to 12 mmol, up to 11.25 mmol, up to 11 mmol, up to 10.5 mmol, up to 10 mmol, up to 9 mmol, up to 8 mmol, or up to 7.5 mmol per gram of the polymeric material. For example, the amount is often in a range of 1.5 to 15 mmol, 1.5 to 12 mmol, 1.5 to 9 mmol, 1.5 to 7.5 mmol, 1.5 to 6 mmol, 1.5 to 4.5 mmol, 2.25 to 9 mmol, 2.25 to 7.5 mmol, 2.25 to 6 mmol, 2.25 to 5 mmol, 2.25 to 4.5 mmol, 3.0 to 9 mmol, 3.0 to 7.5 mmol, 3.0 to 6 mmol, or 3.0 to 4.5 mmol per gram of the polymeric material.

In summary, the metal-containing polymeric material includes a) a polymeric material and b) a divalent metal incorporated into (i.e., sorbed on) the polymeric material in an amount equal to at least 10 wt-% based on the weight of the polymeric material (or at least 1.5 mmol per gram of the polymeric material). The polymeric material contains i) 15 to 65 wt-% of a first monomeric unit that is of Formula (I),

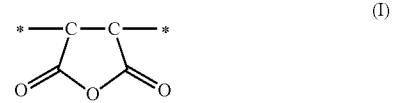

Formula (II),

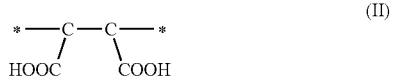

or a mixture thereof; ii) 30 to 85 wt-% of a second monomeric unit that is of Formula (III); and

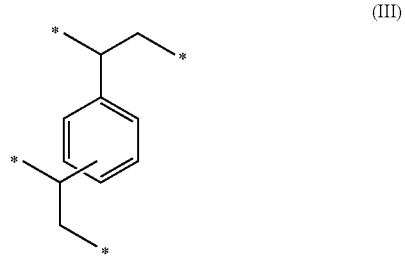

iii) 0 to 40 wt-% (or 5 to 40 wt-%) of a third monomeric unit that is of Formula (IV)

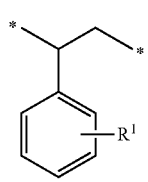

wherein each $R^1$ is independently hydrogen or an alkyl group. Each asterisk (*) in Formulas (I) to (IV) indicates the attachment sight to another monomeric unit or to a terminal group in the polymeric material.

In some embodiments, the metal-containing polymeric material further includes an acid-base indicator. The acid-base colorimetric indicator (i.e., a dye (typically an organic dye) that changes color when it undergoes a transition from being in an acidic form to being in a basic form) is often added at the same time as the divalent metal. The acid-base colorimetric indicator is typically selected such that the basicity of the nitrogen-containing compound being sorbed is sufficient to shift the acid-base colorimetric indicator from its acidic form to its basic form.

A further consideration in the selection of the appropriate acid-base colorimetric indicator involves choosing an acid-base indicator that has a sufficiently lower affinity for the nitrogen-containing compound than the divalent metal such that the acid-base indicator does not change color until all or nearly all of the nitrogen-containing compound sorptive capacity of the divalent metal is exhausted. That is, the acid-base colorimetric indicator is selected to change from a first color to a second color when all or a significant portion of the available divalent metal atoms have had their sorptive capacity for nitrogen-containing compounds exhausted. The change in color then signals that the capacity of the polymeric sorbent for sorption of nitrogen-containing compounds has been reached or is close to being reached. As used herein, the term "close to being reached" means that at least 60 percent or more of the capacity has been reached (i.e., at least 60 percent or more of the available sorption sites have been used for sorption of a nitrogen-containing compound). For example, at least 70 percent, at least 80 percent, at least 90 percent, or at least 95 percent of the sorption sites have been used for sorption of a nitrogen-containing compound.

A final consideration in selecting an acid-base colorimetric indicator involves taking into account the color inherent to the metal-containing polymeric material. Some divalent metals when incorporated into the porous polymeric material impart the resulting metal-containing polymeric material with a color (i.e., $ZnCl_2$ metal-containing polymeric material is pink, $CuCl_2$ metal-containing polymeric material is dark gray/green and the $NiCl_2$ metal-containing polymeric material is tan). Selection of an acid-base colorimetric indicator whose color change from its acidic form to its basic form is obvious in light of the color change that may be inherent from the metal-containing polymeric material itself can be important. It can be advantageous to add an acid-base indicator even to metal-containing polymeric materials which inherently undergo a color change upon sorption of nitrogen-containing compounds in order to access a wider range of colors for the colorimetric indication, and in some cases, to mitigate the moisture sensitivity of the color shift of some metal-containing polymeric materials.

Example acid-base colorimetric indicators include, but are not limited to, methyl red, bromoxylenol blue, pararosaniline, chrysoidine, thymol blue, methyl yellow, bromophenyl blue, Congo red, methyl orange, bromocresol green, azolitmin, bromocresol purple, bromothymol blue, phenol red, neutral red, naphtholphthalein, cresol red, phenolphthalein, and thymolphthalein. The acid-base colorimetric indicators can be added to the polymeric sorbent using any suitable method. In some embodiments, the polymeric sorbent is soaked in a solution of the acid-base colorimetric indicator for at least 10 minutes, at least 20 minutes, at least 30 minutes, at least 1 hour, at least 2 hours, at least 4 hours, or at least 8 hours. The solution of the acid-base colorimetric indicator is often in a concentration range of 1 to 10 milligrams per milliliter. Often, about 0.5 gram of the polymeric sorbent is soaked in about 10 milliliters of the solution.

Although the polymeric material can be non-hydrolyzed, partially hydrolyzed, or fully hydrolyzed, in some applications it may be preferable to use fully hydrolyzed polymeric material. The hydrolyzed polymeric material may perform more consistently than either the non-hydrolyzed or partially hydrolyzed polymeric materials because such materials may change with time (i.e., they have a tendency to undergo hydrolysis or further hydrolysis that may alter their performance characteristics).

In some embodiments, such as with zinc-containing, cobalt-containing, nickel-containing, and magnesium-containing polymeric materials, the divalent metal may be present as an ionic species. For divalent metal that is ionic, a crystalline phase that includes the metal species usually cannot be detected when the metal-containing polymeric materials are analyzed using x-ray diffraction. In other embodiments, such as with copper-containing polymeric materials, the divalent metal may be present as an oxide. For metal oxides, a crystalline phase may be detected when the metal-containing polymeric materials are analyzed using x-ray diffraction.

When analyzed using infrared spectroscopy, a shift in the carbonyl peak can be observed for the polymeric material after incorporation of the divalent metal. While not wanting to be bound by theory, it is believed that the divalent metal may be associated with (i.e., the metal may interact with or may coordinate with) the carboxyl groups or anhydride groups in the polymeric material.

Some of the metal-containing polymeric materials can be colored. Some colored examples include, but are not limited to, those containing zinc (II), copper (II), and nickel (II). Zinc containing-polymeric materials are often pink, copper-containing polymeric materials are often a dark grayish-green, and nickel-containing polymeric materials are often tan.

The metal-containing polymeric materials typically have a lower BET specific surface area than the corresponding polymeric material. The divalent metal resides in the pores of the polymeric material resulting in a decrease in the BET specific surface area. In many embodiments, the BET surface area is at least 15 $m^2/g$, at least 20 $m^2/g$, at least 25 $m^2/g$, at least 30 $m^2/g$, at least 40 $m^2/g$, or at least 50 $m^2/g$.

Binders

The binder of the composite granules can be an organic material, an inorganic material, or a combination thereof.

In certain embodiments, the binder includes an organic polymeric material. In certain embodiments, the organic polymeric material includes a polyelectrolyte material. In certain embodiments, the polyelectrolyte material is derived from natural polymers or modified natural polymers.

In certain embodiments, the polyelectrolyte material is selected from polyamines, polyamides, polyalcohols, polysaacharides, polyacrylamides, polyacrylates, humic acids, proteins, polydiallyldimethylammonium chloride, polydiallyldimethylammonium salts, polyamine-polydiallyldimethylammonium chloride blends, polyquartenary amines, inorganic-polyamine blends, and inorganic polydiallyldimethylammonium chloride blends, cationic starches, cationic polymethylmethacrylates, copolymers of vinylimidazolium methochloride and vinylpyrrolidone, quarternized vinylpyrrolidone/dimethylaminoethyl methacrylate copolymers, polyethyleneimines, and combinations thereof. In certain embodiments, the polyelectrolyte material includes cationic starches.

In certain embodiments, the binder includes metal hydroxides, metal oxides, or combinations thereof. In certain embodiments, the binder includes a metal oxide or hydroxide derived from aluminum, calcium, magnesium, or iron (including polyaluminum sulfates and polyaluminum chlorides). In certain embodiments, the binder includes a material selected from polyorganozirconates, polyorganoaluminates, polysiloxanes, polysilanes, polysilazanes, polycarbosilanes, polyborosilanes, zirconium dimethacrylate, zirconium tetramethacrylate, zirconium 2-ethylhexanoate, magnesium stearate, aluminum butoxides, aluminum diisopropoxide ethylacetoacetate, tetramethyldisiloxanes, tristrimethylsilylphosphate, tristrimethylsiloxyboron, and combinations thereof.

In certain embodiments, the binder includes a silicate (e.g., a metal silicate). In certain embodiments, the metal silicate includes a sodium silicate (e.g., sodium metasilicate), potassium silicate, calcium silicate, magnesium silicate, and combinations thereof. In certain embodiments, the silicate is sodium metasilicate.

In certain embodiments, the binder includes a thermoplastic polymer. In certain embodiments, the thermoplastic polymer is selected from polyamides (such as nylons), polyolefins (such as polyethylenes, e.g., LDPE, LLDPE, HDPE, polyethylene copolymers with other polyolefins, polypropylenes), polyvinylchlorides (both plasticized and unplasticized), fluorocarbon resins (such as polytetrafluoroethylene), polystyrenes, cellulosic resins (such as cellulose acetate butyrates), acrylic resins (such as polyacrylates and polymethacrylates), styrene copolymers (such as acrylonitrile-butadiene-styrenes or acrylonitrile-styrenes), polycarbonates, polyvinylacetates, ethylene-vinyl acetates, polyvinyl alcohols, polyoxymethylene, polyformaldehyde, polyacetals, polyesters (such as polyethylene terephthalate), polyether ether ketones, and phenol-formaldehyde resins (such as resols and novolacs), and combinations thereof.

In certain embodiments, the binder includes a thermoset polymer. In certain embodiments, the thermoset polymer is selected from polyurethanes, silicones, fluorosilicones, phenolic resins, melamine resins, melamine formaldehyde, and urea formaldehyde.

In certain embodiments, the binder includes an elastomer. In certain embodiments, the elastomer is selected from natural rubbers, synthetic rubbers (such as styrene-butadiene rubber, polychloroprene (neoprene), nitrile rubber, butyl rubber), silicones, polyurethanes, alkylated chlorosulfonated polyethylenes, polyolefins, chlorosulfonated polyethylenes, perfluoroelastomers, ethylene-propylene-diene terpolymers, chlorinated polyethylene, fluoroelastomers, and combinations thereof.

In certain embodiments, the binder includes a naturally occurring polymer. In certain embodiments, the naturally occurring polymer is selected from celluloses, collagens, organic acids, and combinations thereof. In certain embodiments, the naturally occurring polymer is a biodegradable polymer. In certain embodiments, the biodegradable polymer is selected from polyethyleneglycols, polylactic acids, polyvinylalcohols, copolymers of polylactideglycolide, cellulose, alginic acid, carrageenans isolated from seaweed, polysaccharides, pectins, xanthans, starches, and combinations thereof. In certain embodiments, the biodegradable polymer is selected from polyethyleneglycols, polylactic acids, polyvinylalcohols, copolymers of polylactideglycolide, and combinations thereof.

In certain embodiments, the binder includes an electrically conductive polymer. In certain embodiments, the electrically conductive polymer is selected from doped polyanilines and polythiophenes.

In certain embodiments, the binder includes a gelling material, an absorbent material, or combinations thereof.

In certain embodiments, the absorbent binder material is a superabsorbent material. In certain embodiments, the superabsorbent material is selected from polyacrylic acids, polyacrylamides, polyalcohols, polyamines, polyethylene oxides, cellulose, chitins, gelatins, starches, polyvinyl alcohols, polyacrylic acid, polyacrylonitrile, carboxymethyl cellulose, alginic acid, carrageenans isolated from seaweeds, polysaccharides, pectins, xanthans, polydiallyldimethylammonium chloride, polyvinylpyridine, polyvinylbenzyltrimethylammonium salts, polyvinylacetates, polylactic acids, and combinations thereof.

Use of Composite Granules

The composite granules can be used to capture vapors of basic, nitrogen-containing compounds. Thus, a method of capturing a basic, nitrogen-containing compound is provided. The method includes providing composite granules that include the metal-containing polymeric material as described above and then exposing the metal-containing polymeric material to vapors of basic, nitrogen-containing compounds. A metal complex is formed. The metal complex includes the reaction product of the divalent metal as defined above and at least one basic, nitrogen-containing compound.

The basic nitrogen-containing compounds that react with the divalent metal to form a metal complex can be classified as Lewis bases, Bronsted-Lowry bases, or both. Suitable basic nitrogen-containing compounds often have a low molecular weight (e.g., no greater than 150 grams/mole). That is, the basic, nitrogen-containing compounds can be volatile at or near room temperature or can be volatile under conditions of use. Examples of basic, nitrogen-containing compounds include, but are not limited to, ammonia, hydrazine compounds, amine compounds (e.g., alkyl amines, dialkylamines, triaalkylamines, alkanolamines, alkylene diamines, arylamines), and nitrogen-containing heterocyclic (saturated and unsaturated) compounds. Specific basic nitrogen-containing compounds include, for example, ammonia, hydrazine, methylhydrazine, methylamine, dimethylamine, trimethylamine, ethylamine, diethylamine, triethylamine, propylamine, dipropylamine, tripropylamine, isopropylamine, diisopropylamine, triisopropylamine, ethanolamine, cyclohexylamine, morpholine, pyridine, benzylamine, phenylhydrazine, ethylene diamine, and 1,3-propane diamine.

After exposure to vapors of the basic, nitrogen-containing compound, the metal-containing polymeric material within the composite granules is converted to a metal complex-containing polymeric material. The metal complex-containing polymeric material includes a) a polymeric material and b) a metal complex incorporated into (i.e., sorbed on) the polymeric material. The polymeric material contains i) 15 to 65 wt-% of a first monomeric unit that is of Formula (I),

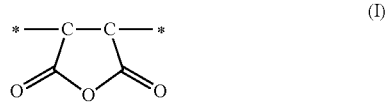

Formula (II),

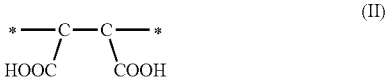

or a mixture thereof; ii) 30 to 85 wt-% of a second monomeric unit that is of Formula (III); and

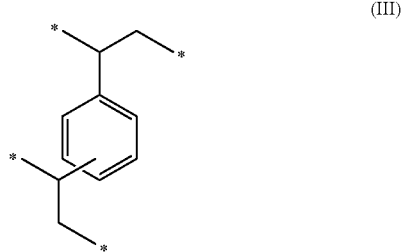

iii) 0 to 40 wt-% (or 5 to 40 wt-%) of a third monomeric unit that is of Formula (IV)

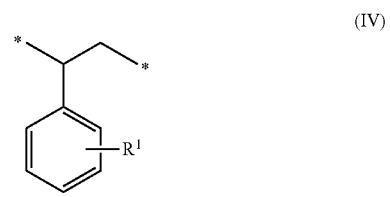

wherein each $R^1$ is independently hydrogen or an alkyl group. Each asterisk (*) in Formulas (I) to (IV) indicates the attachment sight to another monomeric unit or to a terminal group in the polymeric material. The metal complex includes a reaction product of a divalent metal and at least one basic, nitrogen-containing compound.

In many embodiments of the metal complex-containing polymeric material, divalent metal incorporated into the polymeric material remains that has not been converted to a metal complex. That is, the metal complex-containing polymeric material includes a mixture of divalent metal that is not complexed with the basic, nitrogen-containing compound and divalent metal that is complexed with at least one basic, nitrogen-containing compound.

The total amount of divalent metal (whether it is complexed or not with the basic, nitrogen-containing compound) is at least 10 wt-%, based on a total weight of the polymeric material. The total amount of the divalent metal can be at least 20 wt-%, at least 25 wt-%, at least 30 wt-%, at least 40 wt-%, or at least 50 wt-%, based on a total weight of the polymeric material. The amount can be up to 100 wt-% or more. For example, the amount can be up to 90 wt-%, up to 80 wt-%, up to 75 wt-%, up to 70 wt-%, up to 60 wt-%, or up to 50 wt-%, based on the total weight of the polymeric material. For example, the amount is often in a range of 10 to 100 wt-%, 10 to 80 wt-%, 10 to 60 wt-%, 10 to 50 wt-%, 10 to 40 wt-%, 10 to 30 wt-%, 15 to 60 wt-%, 15 to 50 wt-%, 15 to 40 wt-%, 15 to 30 wt-%, 20 to 60 wt-%, 20 to 50 wt-%, 20 to 40 wt-% or 20 to 30 wt-%.

Stated differently, the total amount of divalent metal (whether it is complexed or not with the basic, nitrogen-containing compound) is at least 1.5 mmol per gram of the polymeric material. The total amount of the divalent metal can be at least 3.0 mmol, at least 3.75 mmol, at least 4.5 mmol, at least 6 mmol, or at least 7.5 mmol per gram of the polymeric material. The total amount of the divalent metal can be up to 15 mmol per gram or more. For example, the amount can be up to 13.5 mmol, up to 12 mmol, up to 11.25 mmol, up to 10.5 mmol, up to 9 mmol, or up to 7.5 mmol per gram of the polymeric material. For example, the total amount of divalent metal can be in a range of 1.5 to 15 mmol, 1.5 to 12 mmol, 1.5 to 9 mmol, 1.5 to 7.5 mmol, 1.5 to 6 mmol, 1.5 to 4.5 mmol, 2.25 to 9 mmol, 2.25 to 7.5 mmol, 2.25 to 6 mmol, 2.25 to 5 mmol, 2.25 to 4.5 mmol, 3.0 to 9 mmol, 3.0 to 7.5 mmol, 3.0 to 6 mmol, or 3.0 to 4.5 mmol per gram of the polymeric material.

The maximum amount of basic, nitrogen-containing compounds sorbed (e.g., complexed) by the metal-containing polymeric material is related to the amount of divalent metal incorporated into the polymeric material. The maximum amount of basic, nitrogen-containing compound sorbed is often at least 0.35 milliequivalents per gram of composite granules (i.e., 0.35 milliequivalents of the sorbed basic, nitrogen-containing compound per gram of composite granules) and can be up to 10 milliequivalents per gram or even higher. In many embodiments, the maximum amount sorbed is at least 1 milliequivalent per gram, at least 2 milliequivalents per gram, or at least 3 milliequivalents per gram. The amount sorbed can be, for example, up to 9 milliequivalents per gram, up to 8 milliequivalents per gram, up to 7 milliequivalents per gram, up to 6 milliequivalents per gram, or up to 5 milliequivalents per gram.

Although the amount of divalent metal in the metal-containing polymeric material is an important factor for maximizing the capacity for sorption of basic, nitrogen-containing compounds, an upper amount of divalent metal is reached beyond which the capacity does not continue to increase. That is, beyond a certain point, incorporating more divalent metal into the metal-containing polymeric materials does not result in increased capacity for basic, nitrogen-containing compounds. If the amount of divalent metal incorporated is too large, the surface of the polymeric material may become saturated with the divalent metal and clustering and/or layering of the divalent metal may result. The clustering and/or layering may lead to a decreased amount of the divalent metal being available for coordination with (i.e., complexing with) the basic, nitrogen-containing compounds. Thus, the amount of divalent metal incorporated into the polymeric material can be optimized to obtain maximum sorption capacity for the basic, nitrogen-containing compounds.

The porosity of the polymeric material also affects the capacity of the metal-containing material for sorption of basic, nitrogen-containing compounds. Typically, polymeric materials of the metal-containing material with higher porosity have greater accessibility to functional group sites. Higher porosity polymeric materials, probably due to the presence of mesopores and/or micropores in the polymeric material, typically lead to higher incorporation of divalent metal. Higher incorporation of divalent metal (at least up the point where clustering and/or layering occurs) results in more coordination sites available for sorption of the basic, nitrogen-containing compounds. The porosity and BET specific surface area of the polymeric material can be altered by the amount of crosslinking (i.e., the amount of divinylbenzene) used to prepare the polymeric materials, as well as, the identity and amount of organic solvent present during formation of the polymeric materials.

In some embodiments, only a portion of the divalent metal in the metal-containing polymeric materials is complexed with a basic, nitrogen-containing compound. That is, the maximum amount of basic, nitrogen-containing compound is not sorbed. In this situation, the polymeric materials contain both a metal complex and divalent metal that is not complexed to the basic, nitrogen-containing compound.

Any method of capturing (i.e., sorbing) a basic, nitrogen-containing compound on the metal-containing polymeric material can be used. The method can be used, for example, to determine if there has been any exposure to ammonia or to another basic, nitrogen-containing compound. The capture can occur, for example, within a sensor component used to detect the presence or absence of the basic, nitrogen-containing compound. More specifically, the metal-containing polymeric material can be part of the sensor component. The sensor can be positioned where detection of basic, nitrogen-containing compound is desired.

In some embodiments, particularly if the divalent metal in the metal-containing polymeric material within the composite granules is selected from zinc, nickel, or copper, a color change occurs upon exposure to a basic, nitrogen-containing compound. For example, zinc-containing polymeric materials change from pink to tan, copper-containing polymeric materials change from dark grayish green to turquoise, and nickel-containing polymeric materials change from tan to olive green upon exposure to basic, nitrogen-containing compounds. This color change can be used to indicate exposure to the basic, nitrogen-containing compounds. The intensity of the color after exposure to the basic, nitrogen-containing compound may be related to the amount of exposure.

In addition to colorimetric methods of detecting exposure to the basic, nitrogen-containing compounds, other analytical techniques can be used. For example, the metal-containing polymeric material can be analyzed for nitrogen content. As another example, the presence of the basic nitrogen-containing material may be detected by thermogravimetric analysis (e.g., the weight loss of the basic nitrogen-containing compound can be detected as the temperature is increased).

Besides being useful for capturing basic, nitrogen-containing compounds, zinc-containing polymeric materials can be used for detecting the presence of (or exposure to) water vapor. The method includes providing a zinc-containing polymeric material as described above where the divalent metal is Zn(II) and then exposing the zinc-containing polymeric material to water vapor (such as water in air or in a gaseous composition). The color of the zinc-containing polymeric material changes from pink to tan after exposure to water vapor. The zinc-containing polymeric material can be used as an indicator in desiccants or used in humidity indicator cards in place of the commonly used cobalt chloride, which is carcinogenic. The maximum amount of water vapor sorbed is comparable to the maximum amount of volatile basic, nitrogen-containing compound that can be sorbed by the zinc-containing polymeric material.

EXEMPLARY EMBODIMENTS

Various embodiments are provided that are directed to composite granules that include a metal-containing polymeric material and a binder, a method of capturing a basic, nitrogen-containing compound, composite granules that include a metal complex-containing polymeric material and a binder, and a method of detecting the presence of water vapor.

Embodiment 1 is directed to composite granules comprising a binder and a metal-containing polymeric material. The metal-containing polymeric material comprises a polymer and a divalent metal incorporated into the polymeric material, wherein the divalent metal is present in an amount equal to or at least 1.5 mmol per gram of the polymeric material (or equal to or at least 10 wt-% based on a total weight of the polymeric material). The polymer comprises: i) 15 to 65 wt-% of a first monomeric unit that is of Formula (I), Formula (II), or a mixture thereof:

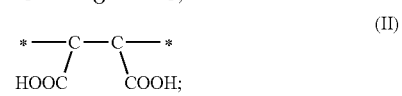

ii) 30 to 85 wt-% of a second monomeric unit that is of Formula (III):

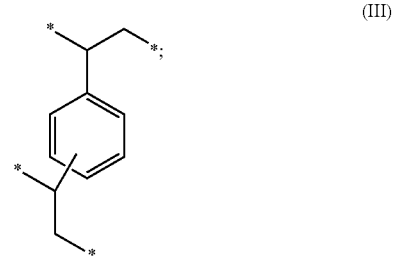

and iii) 0 to 40 wt-% (or 5 to 40 wt-%) of a third monomeric unit that is of Formula (IV):

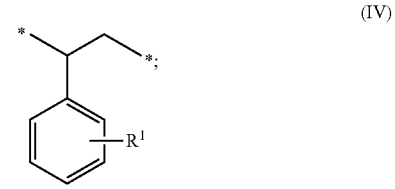

wherein each $R^1$ is independently hydrogen or an alkyl group; and each asterisk (*) in Formulas (I) to (IV) indicates the attachment sight to another monomeric unit or to a terminal group in the polymeric material.

Embodiment 2 is the composite granules of embodiment 1, wherein the amount of the divalent metal incorporated into the polymeric material is in a range of 1.5 to 15 mmol per gram of the polymeric material (or in a range of 10 to 100 wt-% based on the weight of the polymeric material).

Embodiment 3 is the composite granules of embodiment 1 or 2, wherein the divalent metal is from a Group 2 or Group 6 to 12 metal of the IUPAC Periodic Table of Elements.

Embodiment 4 is the composite granules of embodiment 3, wherein the divalent metal is from a Group 6 to 12 metal of the IUPAC Periodic Table of Elements.

Embodiment 5 is the composite granules of embodiment 4, wherein the divalent metal is copper, cobalt, zinc, or nickel.

Embodiment 6 is the composite granules of embodiment 5, wherein the divalent metal is zinc or copper.

Embodiment 7 is the composite granules of embodiment 6, wherein the divalent metal is zinc.

Embodiment 8 is the composite granules of any one of embodiments 1 to 7, wherein the polymeric material comprises: i) 25 to 60 wt-% monomeric units of Formula (I), Formula (II), or a mixture thereof; ii) 30 to 75 wt-% monomeric units of Formula (III); and iii) 1 to 30 wt-% (or 10 to 30 wt-%) monomeric units of Formula (IV).

Embodiment 9 is the composite granules of any one of embodiments 1 to 8, wherein the polymeric material comprises: i) 30 to 60 wt-% monomeric units of Formula (I), Formula (II), or a mixture thereof; ii) 30 to 65 wt-% monomeric units of Formula (III); and iii) 5 to 20 wt-% (or 10 to 20 wt-%) monomeric units of Formula (IV).

Embodiment 10 is the composite granules of any one of embodiments 1 to 9, wherein the polymeric material comprises: i) 40 to 60 wt-% monomeric units of Formula (I), Formula (II), or a mixture thereof; ii) 30 to 55 wt-% monomeric units of Formula (III); and iii) 5 to 20 wt-% (or 10 to 20 wt-%) monomeric units of Formula (IV).

Embodiment 11 is the composite granules of any one of embodiments 1 to 10, wherein the metal-containing polymeric material has a BET specific surface area equal to at least 15 $m^2/g$ or at least 25 $m^2/g$.

Embodiment 12 is the composite granules of any one of embodiments 1 to 11, wherein the binder comprises an organic material, an inorganic material, or a combination thereof.

Embodiment 13 is the composite granules of embodiment 12, wherein the binder comprises an organic polymeric material.

Embodiment 14 is the composite granules of embodiment 13, wherein the organic polymeric material comprises a polyelectrolyte material.

Embodiment 15 is the composite granules of embodiment 14, wherein the polyelectrolyte material is derived from natural polymers or modified natural polymers.

Embodiment 16 is the composite granules of embodiment 15, wherein the polyelectrolyte material is selected from polyamines, polyamides, polyalcohols, polysaacharides, polyacrylamides, polyacrylates, humic acids, proteins, polydiallyldimethylammonium chloride, polydiallyldimethylammonium salts, polyamine-polydiallyldimethylammonium chloride blends, polyquartenary amines, inorganic-polyamine blends, and inorganic polydiallyldimethylammonium chloride blends, cationic starches, cationic polymethylmethacrylates, copolymers of vinylimidazolium methochloride and vinylpyrrolidone, quarternized vinylpyrrolidone/dimethylaminoethyl methacrylate copolymers, polyethyleneimines, and combinations thereof.

Embodiment 17 is the composite granules of embodiment 16, wherein the polyelectrolyte material comprises cationic starch.

Embodiment 18 is the composite granules of embodiment 12, wherein the binder comprises a material selected from polyorganozirconates, polyorganoaluminates, polysiloxanes, polysilanes, polysilazanes, polycarbosilanes, polyborosilanes, zirconium dimethacrylate, zirconium tetramethacrylate, zirconium 2-ethylhexanoate, magnesium stearate, aluminum butoxides, aluminum diisopropoxide ethylacetoacetate, tetramethyldisiloxanes, tristrimethylsilylphosphate, tristrimethylsiloxyboron, and combinations thereof.

Embodiment 19 is the composite granules of embodiment 12, wherein the binder comprises metal hydroxides, metal oxides, or combinations thereof.

Embodiment 20 is the composite granules of embodiment 19, wherein the binder comprises a metal oxide or hydroxide derived from aluminum, calcium, magnesium, or iron (including polyaluminum sulfates and polyaluminum chlorides).

Embodiment 21 is the composite granules of embodiment 13, wherein the binder comprises a thermoplastic polymer.

Embodiment 22 is the composite granules of embodiment 21, wherein the thermoplastic polymer is selected from polyamides (such as nylons), polyolefins (such as polyethylenes, e.g., LDPE, LLDPE, HDPE, polyethylene copolymers with other polyolefins, polypropylenes), polyvinylchlorides (both plasticized and unplasticized), fluorocarbon resins (such as polytetrafluoroethylene), polystyrenes, cellulosic resins (such as cellulose acetate butyrates), acrylic resins (such as polyacrylates and polymethacrylates), styrene copolymers (such as acrylonitrile-butadiene-styrenes or acrylonitrile-styrenes), polycarbonates, polyvinylacetates, ethylene-vinyl acetates, polyvinyl alcohols, polyoxymethylene, polyformaldehyde, polyacetals, polyesters (such as polyethylene terephthalate), polyether ether ketones, and phenol-formaldehyde resins (such as resols and novolacs), and combinations thereof.

Embodiment 23 is the composite granules of embodiment 13, wherein the binder comprises a thermoset polymer.

Embodiment 24 is the composite granules of embodiment 23, wherein the thermoset polymer is selected from polyurethanes, silicones, fluorosilicones, phenolic resins, melamine resins, melamine formaldehyde, and urea formaldehyde.

Embodiment 25 is the composite granules of embodiment 13, wherein the binder comprises an elastomer.

Embodiment 26 is the composite granules of embodiment 25, wherein the elastomer is selected from natural rubbers, synthetic rubbers (such as styrene-butadiene rubber, polychloroprene (neoprene), nitrile rubber, butyl rubber), silicones, polyurethanes, alkylated chlorosulfonated polyethylenes, polyolefins, chlorosulfonated polyethylenes, perfluoroelastomers, ethylene-propylene-diene terpolymers, chlorinated polyethylene, fluoroelastomers, and combinations thereof.

Embodiment 27 is the composite granules of embodiment 13, wherein the binder comprises a naturally occurring polymer.

Embodiment 28 is the composite granules of embodiment 27, wherein the naturally occurring polymer is selected from celluloses, collagens, organic acids, and combinations thereof.

Embodiment 29 is the composite granules of embodiment 27, wherein the naturally occurring polymer is a biodegradable polymer.

Embodiment 30 is the composite granules of embodiment 29, wherein the biodegradable polymer is selected from polyethyleneglycols, polylactic acids, polyvinylalcohols, copolymers of polylactideglycolide, cellulose, alginic acid, carrageenans isolated from seaweed, polysaccharides, pectins, xanthans, starches, and combinations thereof.

Embodiment 31 is the composite granules of embodiment 13, wherein the binder comprises an electrically conductive polymer.

Embodiment 32 is the composite granules of embodiment 13, wherein the binder comprises a gelling material, an absorbent material, or combinations thereof.

Embodiment 33 is the composite granules of embodiment 32, wherein the absorbent binder material is a superabsorbent material.

Embodiment 34 is the composite granules of embodiment 33, wherein the superabsorbent material is selected from polyacrylic acids, polyacrylamides, polyalcohols, polyamines, polyethylene oxides, cellulose, chitins, gelatins, starches, polyvinyl alcohols, polyacrylic acid, polyacrylonitrile, carboxymethyl cellulose, alginic acid, carrageenans isolated from seaweeds, polysaccharides, pectins, xanthans, polydiallyldimethylammonium chloride, polyvinylpyridine, polyvinylbenzyltrimethylammonium salts, polyvinylacetates, polylactic acids, and combinations thereof.

Embodiment 35 is the composite granules of embodiment 12, wherein the binder comprises a silicate (e.g., metal silicate). In certain embodiments, the metal silicate includes sodium silicate (e.g., sodium metasilicate), potassium silicate, calcium silicate, magnesium silicate, and combinations thereof. In certain embodiments, the metal silicate includes sodium metasilicate.

Embodiment 36 is the composite granules of any one of embodiments 1 to 35, wherein the binder is present in an amount of at least 1 wt-%, based on the total weight of the composite granules.

Embodiment 37 is the composite granules of any one of embodiments 1 to 36, wherein the binder is present in an amount of up to 30 wt-%, up to 25 wt-%, or up to 20 wt-%, based on the total weight of the composite granules.

Embodiment 38 is the composite granules of any one of embodiments 1 to 37, wherein the metal-containing polymeric material is present in an amount of at least 70 wt-%, at least 75 wt-%, or at least 80 wt-%, based on the total weight of the composite granules.

Embodiment 39 is the composite granules of any one of embodiments 1 to 38, wherein the metal-containing polymeric material is present in an amount of up to 99 wt-%, based on the total weight of the composite granules.

Embodiment 40 is the composite granules of any one of embodiments 1 to 39, wherein the metal-containing polymeric material further comprises an acid-base colorimetric indicator.

Embodiment 41 is the composite granules of any one of embodiments 1 to 40, wherein the composite granules sorb an amount of a basic, nitrogen-containing compound in an amount of at least 0.35 milliequivalents per gram of composite granules (or an amount in a range of 0.35 to 10 milliequivalents per gram of composite granules).

Embodiment 42 is a method of capturing a basic, nitrogen-containing compound, the method comprising: providing composite granules of any one of embodiments 1 to 41; and exposing the composite granules to vapors of the basic, nitrogen-containing compound; wherein the basic, nitrogen-containing compound reacts with the divalent metal of the metal-containing polymeric material within the composite granules to form a metal complex.

Embodiment 43 is the method of embodiment 42, wherein the composite granules change color upon exposing the composite granules to the basic, nitrogen-containing compound.

Embodiment 44 is the method of embodiment 42 or 43, wherein the basic, nitrogen-containing compound has a molecular weight no greater than 150 grams/mole.

Embodiment 45 is the method of any one of embodiments 42 to 44, wherein the basic, nitrogen-containing compound is ammonia, a hydrazine compound, an amine compound, or a nitrogen-containing heterocyclic compound.

Embodiment 46 is the method of embodiment 45, wherein the basic, nitrogen-containing compound is selected from ammonia, hydrazine, methylhydrazine, methylamine, dimethylamine, trimethylamine, ethylamine, diethylamine, trimethylamine, propylamine, dipropylamine, tripropylamine, isopropylamine, diisopropylamine, triisopropylamine, ethanolamine, cyclohexylamine, morpholine, pyridine, benzylamine, phenylhydrazine, ethylene diamine, 1,3-propane diamine, and a mixture thereof.

Embodiment 47 is the method of any one of embodiments 42 to 46, wherein the basic, nitrogen-containing compound is sorbed in an amount equal to at least 0.35 milliequivalent per gram of composite granules.

Embodiment 48 is the method of any one of embodiments 42 to 47, wherein the basic, nitrogen-containing compound is sorbed in an amount that is in a range of 0.35 to 10 milliequivalents per gram of composite granules.

Embodiment 49 is directed to metal complex-containing composite granules prepared according to the method of any one of embodiments 42 to 48, wherein the composite granules comprise a binder and a metal complex-containing polymeric material, wherein the metal complex comprises a reaction product of a divalent metal and at least one basic, nitrogen-containing compound.

Embodiment 50 is the metal complex-containing composite granules of embodiment 49, wherein the metal complex-containing polymeric material further comprises divalent metal that is not in the form of the metal complex.

Embodiment 51 is a method of detecting the presence of water vapor, the method comprising: providing composite granules of any one of embodiments 1 to 41, wherein the divalent metal is zinc (i.e., the metal-containing polymeric material is a zinc-containing polymeric material); and exposing the composite granules to water vapor; wherein the zinc-containing polymeric material within the composite granules changes after exposing the zinc-containing polymeric material to water vapor.

Embodiment 52 is the method of embodiment 51, wherein the zinc-containing polymeric material comprises 10 to 100 wt-% zinc based on the weight of the polymeric material (or in a range of 1.5 to 15 mmol zinc per gram of the polymeric material).

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

These abbreviations are used in the following examples: ppm=parts per million; cm=centimeter; mL=milliliter; L=liter; g=grams; mg=milligrams; min=minutes; h=hour; ° C.=degrees Celsius; p/p°=relative pressure; psi=per square inch; mol=mole; mmol=millimole; M=molar; and wt-%=weight percent; pounds per square inch=psi.

Materials Used:

The materials with their sources were as listed in Table 1. Unless otherwise indicated, all materials were purchased from commercial sources and used as received.

TABLE 1

Materials List

| Chemical Name | Chemical Supplier |
|---|---|
| Divinylbenzene (DVB) (80% technical grade), which contained 80 wt-% DVB and 20 wt-% styrene-type monomers. The calculation of moles of DVB used to prepare the polymeric material does take into account the purity. | Sigma-Aldrich, Milwaukee, WI |
| Maleic anhydride (MA) | Alfa Aesar, Ward Hill, MA |
| 2,2'-azobis(2,4-dimethylpentanenitrile) (VAZO 52) | E.I. du Pont Nemours, Wilmington, DE |
| Ethyl acetate (EtOAc) | EMD Millipore Corporation, Billerica, MA |
| Sodium hydroxide (NaOH) | EMD Millipore Corporation, Billerica, MA |
| 1M Hydrogen chloride (HCl) | Avantor Performance Materials, Central Valley, PA |
| Zinc(II) chloride ($ZnCl_2$), anhydrous, 98+% | Alfa Aesar, Ward Hill, MA |
| METHOCEL E50 PVC, hydroxypropyl methylcellulose (CMC) | Dow Chemical Company, Midland, MI |
| Magnesium stearate (MgSt) | Alfa Aesar, Ward Hill, MA |
| Sodium metasilicate ($Na_2O_3Si$), anhydrous, −18 mesh granular | Alfa Aesar, Ward Hill, MA |

Gas Sorption Analysis

Porosity and gas sorption experiments were performed using an Accelerated Surface Area and Porosimetry (ASAP) 2020 system from Micromeritics Instrument Corporation (Norcross, Ga.). The adsorbates were of ultra-high purity. The following is a typical method used for the characterization of the porosity within the exemplified materials. In a Micromeritics half inch (1.3 cm) diameter sample tube, 50-250 mg of material was degassed by heating under ultra-high vacuum (3-7 micrometers Hg) on the analysis port of the ASAP 2020 to remove residual solvent and other adsorbates. The degas procedure for the non-hydrolyzed copolymers was 2 h at 150° C. The degas procedure for the hydrolyzed copolymers was 2 h at 80° C. The degas procedure for the metal containing copolymers was 3 h at 150° C.

Argon sorption isotherms at 77 K for the non-hydrolyzed and hydrolyzed copolymers were obtained using low pressure dosing (5 cm$^3$/g) at a p/p° less than 0.1 and a pressure table of linearly spaced pressure points from a p/p° in a range from 0.1 to 0.98. Argon sorption isotherms at 77 K for the metal containing copolymers were obtained using low pressure dosing (2 cm$^3$/g) at a p/p° less than 0.1 and a pressure table of linearly spaced pressure points from a p/p° in a range from 0.1 to 0.98. The method for all isotherms made use of the following equilibrium intervals: 90 seconds at p/p° less than $10^{-5}$, 40 seconds at p/p° in a range of $10^{-5}$ to 0.1, and 20 seconds at p/p° greater than 0.1. Helium was used for the free space determination, after argon sorption analysis, both at ambient temperature and at 77 K. BET specific surface areas ($SA_{BET}$) were calculated from argon adsorption data by multipoint Brunauer-Emmett-Teller (BET) analysis. Apparent micropore distributions were calculated from argon adsorption data by density functional theory (DFT) analysis using the argon at 77 K on carbon slit pores by non-linear density functional theory (NLDFT) model. Total pore volume was calculated from the total amount of argon adsorbed at a p/p° equal to approximately 0.98. BET, DFT and total pore volume analyses were performed using Micromeritics MicroActive Version 1.01 software.

Ammonia Capacity Test

A simple flow-through custom built delivery system was used to deliver known concentrations of ammonia to the sample for measurement. Stainless steel tubing was used throughout the delivery system. Ammonia was delivered to the system from a dry 1% (10,000 parts per million (ppm)) certified ammonia in nitrogen pressurized gas cylinder (Oxygen Service Company, St. Paul, Minn.). The ammonia/nitrogen stream was further diluted with additional nitrogen by use of a series of digital mass flow controllers (available under the designation DFC26 from Aalborg, Orangeburg, N.Y.) to deliver a 1000 ppm stream of ammonia at a flow of 50 mL/min to the testing tube. The digital mass flow controllers were calibrated by placing a Gilibrator-2 Primary Airflow Calibrator (Sensidyne, St. Petersburg, Fla.) at the output of each controller. The Gilibrator flow meter was used to measure a range of flows from each flow controller that was used to generate calibration curves. Using these calibration curves, the mass flow controllers were set to deliver the desired ammonia concentration at the desired gas flow rate.

The ammonia removal capacity for a test material was determined by adding sieved particles of a test material to a tared test tube until the bed depth in the tube was 0.5 cm after being tamped. The inner diameter of the test tube was 0.7 cm. The mass of the test material was then determined by weighing the test material in the test tube. The test tube was then connected in line with the system, allowing the 1000 ppm ammonia gas stream to flow through the test material. To the downstream side of the test tube, tubing was connected that led to a gas chromatograph instrument (SRI 8610C, SRI Instruments, Torrance, Calif.). At the time the ammonia gas stream began to pass through the test material, the test was considered started, and a timer was started. The SRI gas chromatograph then periodically sampled the gas stream and passed the sample of the gas stream through a 6 feet×⅛ inch×0.085 inch (1.83 m×0.32 cm×0.22 cm) AT steel ALLTECH CHROMOSORB 103 80/100 column (Alltech Associates, Grace Davidson Discovery Sciences, Bannockburn, Ill.). The gas chromatograph instrument was equipped with a 10.6 eV lamp photoionization (PID) detector to detect ammonia in the effluent. Good ammonia vapor detection occurred when the gas chromatograph sampled the gas stream for 20 seconds, allowed the sample of the gas stream to pass through the column for 280 seconds, and then flushed out the sample of the gas stream for 60 seconds before it drew in the next sample of the gas stream to be analyzed.

Prior to testing, a certified 57 ppm ammonia in nitrogen pressurized gas cylinder (Oxygen Services Company, St. Paul, Minn.) was used to calibrate the gas chromatograph software. The signal generated by this effluent was used to set the software to 50 ppm ammonia. The end point of the ammonia vapor test was defined as the point corresponding to the time at which the ammonia effluent passing through the bed of test material produced a signal on the PID detector that exceeded the signal corresponding to 50 ppm. The performance of each test material was reported as the number of minutes until 50 ppm breakthrough was observed performing the test as described above. In addition, the area under the curve of the breakthrough plot until 50 ppm breakthrough coupled with the known mass of the test material used in this fixed volume test was used to calculate a mmol/g capacity for each test material using a sum of least squares equation.

Preparatory Example 1

In a 2 L Parr stainless steel pressure vessel, 177.11 g (1.09 mol) DVB (80 wt-% purity, technical grade), 240.05 g (2.45 mol) of MA, and 4.17 g (16.8 mmol) of VAZO 52 was dissolved in 625.92 g of EtOAc. The polymerizable composition had 40.0 wt-% solids in EtOAc and contained a monomer mixture (34.0 wt-% DVB, 57.5 wt-% MA, and 8.5 wt-% styrene-type monomers) and 1 wt-% VAZO 52 (based on total weight of monomers). The polymerizable composition was bubbled with nitrogen for 15 min. The pressure vessel was then sealed and placed in a water bath at 60° C. The polymerizable composition was heated at this elevated temperature for 18 h. A white precipitate that formed was isolated by vacuum filtration and washed with EtOAc. The solid was placed in a 4 L Erlenmeyer flask and 2.0 L of EtOAc was added to the flask. The solid was allowed to stand in EtOAc for one hour at room temperature. The solid was again isolated by vacuum filtration and washed with EtOAc. The solid was again placed in a 4 L Erlenmeyer flask and 2.0 L of EtOAc was added to the flask. The solid was allowed to stand in EtOAc overnight. The solid was again isolated by vacuum filtration and washed with EtOAc. The solid was then dried in a batch oven at 100° C. for 18 h. This non-hydrolyzed polymeric material had a $SA_{BET}$ of 320.8 $m^2/g$ and a total pore volume of 0.250 $cm^3/g$ (p/p° equal to 0.977) as determined by argon adsorption.

Preparatory Example 2

The non-hydrolyzed polymeric material described in Preparatory Example 1 was treated with a hydrolyzing agent (sodium hydroxide (NaOH)). More specifically, 40.8 g (1.02 mol) of NaOH was dissolved in 340 mL of deionized water within a 1 L jar. To this solution was added 35.0 g of the above non-hydrolyzed polymeric material which had been milled down using a rotary mill with a 1.0 mm sieve screen by IKA (Wilmington, N.C.) and sieved to a particle size range of 120×170 mesh by isolation utilizing USA standard test No. 120 and 170 wire mesh sieves (ASTM E-11 standard; Hogentogler and Co., Inc. Columbia, Md.) and a Meinzer II Sieve Shaker (CSC Scientific Company, Inc., Fairfax, Va.) operated for 15 minutes before the separated material was collected.

The jar was then capped and placed on a jar roller. This suspension was allowed to roll at room temperature for 18 h. The solid was isolated by vacuum filtration and washed with deionized water. The solid was returned to the 1 L jar, and 1 M aqueous hydrogen chloride (HCl) was added to the jar such that the measured pH was around 1. The jar was capped and placed on a jar roller to roll overnight at room temperature. The solid was again isolated by vacuum filtration and washed with deionized water. The solid was then dried under high vacuum at 95° C. for 8 h.

This hydrolyzed polymeric material was then treated with zinc(II) chloride ($ZnCl_2$). More specifically, 224 g (1.64 mol) of $ZnCl_2$ was dissolved in 274 mL of deionized water within a 1 L jar. To this solution was added 35 g of the hydrolyzed polymeric material. The jar was capped and placed on a jar roller. This suspension was continuously rolled for 18 h at room temperature. The solid was isolated by vacuum filtration without using additional deionized water to transfer or wash the zinc-containing polymeric material. The solid was then dried under high vacuum at 95° C. for 18 h. This dry zinc-containing polymeric material was pinkish-purple in color. This zinc-containing polymeric material had a $SA_{BET}$ of 25.9 $m^2/g$ and a total pore volume of 0.060 $cm^3/g$ (p/p° equal to 0.95) as determined by argon adsorption.

Examples 1-6

Samples for Examples 1-6 were prepared by combining, within a 20 mL vial, 2.00 g of zinc-containing polymeric material prepared in Preparatory Example 2 with the following types and amounts of binders listed in Table 2.

TABLE 2

List of binder types and amounts for Examples 1-6

| Example # | Binder Type | Binder Amount (wt-%) | Binder Amount (g) |
|---|---|---|---|
| 1 | METHOCEL E50 PVC (CMC) | 5 | 0.10 |
| 2 | METHOCEL E50 PVC (CMC) | 10 | 0.20 |
| 3 | Magnesium Stearate (MgSt) | 5 | 0.10 |
| 4 | Magnesium Stearate (MgSt) | 10 | 0.20 |

TABLE 2-continued

List of binder types and amounts for Examples 1-6

| Example # | Binder Type | Binder Amount (wt-%) | Binder Amount (g) |
|---|---|---|---|
| 5 | Sodium Metasilicate ($Na_2O_3Si$) | 5 | 0.10 |
| 6 | Sodium Metasilicate ($Na_2O_3Si$) | 10 | 0.20 |

Each sample was then added, individually, to a 25 mm inner diameter pellet die by Carver, Inc. (Wabash, Ind.). The pellet die was then placed between the 2 platens of a benchtop heated press with a 230 volt temperature controller, model 4389, by Carver, Inc. (Wabash, Ind.). The samples were then compacted, one at a time, at a pressure of 38,000 psi and a temperature of 100° C. for 5 min using the benchtop press.

The samples were then ejected from the pellet die using the benchtop press. Once ejected, the now compacted tablet of material was broken up and milled down using a rotary mill with a 2.0 mm sieve screen by IKA (Wilmington, N.C.). The broken up material was then sieved to isolate all material that was 40 mesh and lower in size by utilizing a USA standard test No. 40 wire mesh sieve (ASTM E-11 standard; Hogentogler and Co., Inc. Columbia, Md.) and a Meinzer II Sieve Shaker (CSC Scientific Company, Inc., Fairfax, Va.) operated for 15 min before the separated material was collected. The material 40 mesh and lower in size was collected in a new clean 20 mL vial. Table 3 lists how much material was recovered after sieving and the yield for Examples 1-6. The remaining fine material (greater than 40 mesh material) could be pressed again into pellets, ground and sieved to eventually yield nearly 100% composite granules.

TABLE 3

List of recovered material 40 mesh and lower and yield for Examples 1-6

| Example # | <40 Mesh Recovered (g) | <40 Mesh Yield (%) |
|---|---|---|
| 1 | 1.02 | 60.0 |
| 2 | 1.27 | 62.2 |
| 3 | 0.77 | 41.2 |
| 4 | 0.63 | 30.7 |
| 5 | 0.85 | 43.8 |
| 6 | 0.86 | 40.6 |

The composite granules (less than 40 mesh material) were used to perform the ammonia vapor test, as described above, to determine the ammonia capacity of the composite granules of Examples 1-6.

The number of minutes each test lasted and the calculated mmol/g capacity can be found in Table 4 for Examples 1-6.

TABLE 4

Tabulated ammonia flow testing results

| Sample | Binder | Binder Loading (wt-%) | Minutes Until 50 ppm Breakthrough | Capacity (mmol/g) |
|---|---|---|---|---|
| Example 1 | METHOCEL E50 PVC (CMC) | 5 | 164 | 1.98 |
| Example 2 | METHOCEL E50 PVC (CMC) | 10 | 92 | 1.13 |
| Example 3 | Magnesium Stearate (MgSt) | 5 | 205 | 2.63 |
| Example 4 | Magnesium Stearate (MgSt) | 10 | 185 | 2.41 |
| Example 5 | Sodium Metasilicate ($Na_2O_3Si$) | 5 | 175 | 2.04 |
| Example 6 | Sodium Metasilicate ($Na_2O_3Si$) | 10 | 158 | 1.79 |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

We claim:

1. Composite granules comprising:
a binder; and
a metal-containing polymeric material comprising:
 a) a polymer comprising:
  i) 15 to 65 wt-% of a first monomeric unit that is of Formula (I), Formula (II), or a mixture thereof:

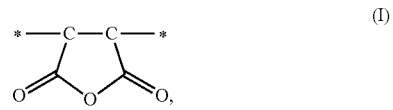

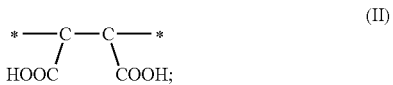

ii) 30 to 85 wt-% of a second monomeric unit that is of Formula (III):

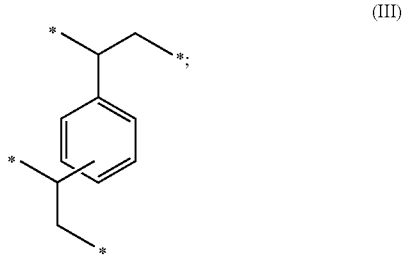

and iii) 0 to 40 wt-% of a third monomeric unit that is of Formula (IV):

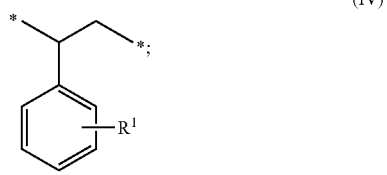

wherein each $R^1$ is independently hydrogen or an alkyl group; and each asterisk (*) in Formulas (I) to (IV) indicates the attachment site to another monomeric unit or to a terminal group in the polymeric material; and b) a divalent metal incorporated into the polymeric material, wherein the divalent metal is present in an amount equal to or at least 1.5 mmol per gram of the polymeric material.

2. The composite granules of claim 1, wherein the amount of the divalent metal incorporated into the polymeric material is in a range of 1.5 to 15 mmol/g of the polymeric material.

3. The composite granules of claim 1, wherein the divalent metal is copper, cobalt, zinc, or nickel.

4. The composite granules of claim 1, wherein the binder comprises an organic material, an inorganic material, or a combination thereof.

5. The composite granules of claim 4, wherein the binder comprises metal hydroxides, metal oxides, or combinations thereof.

6. The composite granules of claim 4, wherein the binder comprises a silicate.

7. The composite granules of claim 6, wherein the silicate is selected from a sodium silicate, potassium silicate, calcium silicate, magnesium silicate, and combinations thereof.

8. The composite granules of claim 4, wherein the binder comprises a material selected from polyorganozirconates, polyorganoaluminates, polysiloxanes, polysilanes, polysilazanes, polycarbosilanes, polyborosilanes, zirconium dimethacrylate, zirconium tetramethacrylate, zirconium 2-ethylhexanoate, magnesium stearate, aluminum butoxides, aluminum diisopropoxide ethylacetoacetate, tetramethyldisiloxanes, tristrimethylsilylphosphate, tristrimethylsiloxyboron, and combinations thereof.

9. The composite granules of claim 4, wherein the binder comprises a thermoplastic polymer.

10. The composite granules of claim 4, wherein the binder comprises a thermoset polymer.

11. The composite granules of claim 4, wherein the binder comprises an elastomer.

12. The composite granules of claim 4, wherein the binder comprises a naturally occurring polymer.

13. The composite granules of claim 4, wherein the binder comprises an electrically conductive polymer.

14. The composite granules of claim 4, wherein the binder comprises a gelling material, an absorbent material, or combinations thereof.

15. The composite granules of claim 4, wherein the binder comprises a superabsorbent material selected from polyacrylic acids, polyacrylamides, polyalcohols, polyamines, polyethylene oxides, cellulose, chitins, gelatins, starches, polyvinyl alcohols, polyacrylic acid, polyacrylonitrile, carboxymethyl cellulose, alginic acid, carrageenans isolated from seaweeds, polysaccharides, pectins, xanthans, polydiallyldimethylammonium chloride, polyvinylpyridine, polyvinylbenzyltrimethylammonium salts, polyvinylacetates, polylactic acids, and combinations thereof.

16. The composite granules of claim 1, wherein the metal-containing polymeric material further comprises an acid-base colorimetric indicator.

17. A method of capturing a basic, nitrogen-containing compound, the method comprising: providing composite granules of claim 1; and exposing the composite granules to vapors of the basic, nitrogen-containing compound;

wherein the basic, nitrogen-containing compound reacts with the divalent metal of the metal-containing polymeric material within the composite granules to form a metal complex.

18. The method of claim 17, wherein the composite granules change color upon exposing the composite granules to the basic, nitrogen-containing compound.

19. A method of detecting the presence of water vapor, the method comprising:

providing composite granules of claim 1, wherein the divalent metal is zinc; and exposing the composite granules to water vapor;

wherein the zinc-containing polymeric material within the composite granules changes after exposing the zinc-containing polymeric material to water vapor.

* * * * *